(12) United States Patent
Laranang et al.

(10) Patent No.: US 10,685,521 B1
(45) Date of Patent: Jun. 16, 2020

(54) BUS PASSENGER TRACKING

(71) Applicant: Secured Mobility, LLC, Georgetown, TX (US)

(72) Inventors: Michael Laranang, Georgetown, TX (US); Brett Christian Taylor, Georgetown, TX (US); Ricardo Sevilla Lopez, Georgetown, TX (US); Emmanuel Enrique Lopez, Georgetown, TX (US)

(73) Assignee: Secured Mobility, LLC, Georgetown, TX (US)

( * ) Notice: Subject to any disclaimer, the term of this patent is extended or adjusted under 35 U.S.C. 154(b) by 574 days.

(21) Appl. No.: 14/746,412

(22) Filed: Jun. 22, 2015

Related U.S. Application Data

(60) Provisional application No. 62/015,226, filed on Jun. 20, 2014.

(51) Int. Cl.
*G07C 9/28* (2020.01)
*G06F 3/0484* (2013.01)
*G06F 3/0481* (2013.01)
*G06F 3/0482* (2013.01)
*G08B 21/04* (2006.01)
*B60W 40/08* (2012.01)

(52) U.S. Cl.
CPC ............... *G07C 9/28* (2020.01); *B60W 40/08* (2013.01); *G06F 3/0482* (2013.01); *G06F 3/04817* (2013.01); *G06F 3/04842* (2013.01); *G08B 21/0423* (2013.01); *B60W 2040/0881* (2013.01)

(58) Field of Classification Search
CPC ............... G06F 3/04817; G06F 3/0482; G06F 3/04842; G07C 9/00111; G08B 21/0423
See application file for complete search history.

(56) References Cited

U.S. PATENT DOCUMENTS 6,006,159 A  12/1999  Schmier et al.
6,502,030 B2  12/2002  Hilleary
(Continued)

FOREIGN PATENT DOCUMENTS

EP         851377 A1     7/1998
WO    WO2000046772 A9   7/2001

OTHER PUBLICATIONS

A. A. Sulaiman, M. S. A. Bakar, M. Z. H. Noor and S. A. C. Abdullah, "Easy Access Attendance Management System (EAMS)," 2014 IEEE 6th Conference on Engineering Education (ICEED), Kuala Lumpur, 2014, pp. 105-110. (Year: 2014).*
(Continued)

*Primary Examiner* — Justin R. Blaufeld
(74) *Attorney, Agent, or Firm* — Fish & Richardson P.C.

(57) ABSTRACT

Methods, systems, and apparatus, including computer programs encoded on computer storage media, for tracking students on school buses. In one aspect, a method includes storing, in an onboard computing device, a list of students associated with respective stops on a bus route, storing, in the onboard computing device, a list of students on the bus, determining that the bus has reached a designated stop, and presenting on a display a list of students associated with the designated stop. As each student enters or exits the bus, the methods include receiving an electronic signal identifying the student entering or exiting the bus and adding or removing the student to or from the list of students on the bus.

16 Claims, 28 Drawing Sheets

(56) References Cited

U.S. PATENT DOCUMENTS

| | | | |
|---|---|---|---|
| 6,631,841 B2 | 10/2003 | Roberts et al. | |
| 6,762,684 B1 | 7/2004 | Camhi | |
| 7,231,355 B2* | 6/2007 | Schoen | G06Q 10/02 705/333 |
| 8,400,296 B2 | 3/2013 | Brinton et al. | |
| 9,330,389 B2 | 5/2016 | Pitroda et al. | |
| 9,399,469 B1* | 7/2016 | Harrison | G08B 21/24 |
| 9,977,935 B1 | 5/2018 | Laranang et al. | |
| 10,452,878 B1 | 10/2019 | Laranang | |
| 2002/0082771 A1* | 6/2002 | Anderson | G01C 21/3484 701/423 |
| 2004/0111279 A1* | 6/2004 | Schoen | G06Q 10/02 705/40 |
| 2005/0040224 A1 | 2/2005 | Brinton et al. | |
| 2005/0219056 A1* | 10/2005 | McHugh | G07C 9/28 340/573.4 |
| 2006/0262190 A1 | 11/2006 | Millar | |
| 2007/0024440 A1* | 2/2007 | Moran | G08G 1/127 340/539.13 |
| 2007/0061076 A1 | 3/2007 | Shulman | |
| 2007/0078908 A1* | 4/2007 | Rohatgi | G07C 9/37 |
| 2008/0292211 A1 | 11/2008 | Frantz | |
| 2011/0068954 A1 | 3/2011 | McQuade et al. | |
| 2011/0098915 A1 | 4/2011 | Disatnik et al. | |
| 2013/0108155 A1 | 5/2013 | Mizutani et al. | |
| 2013/0127616 A1* | 5/2013 | Robitaille | G07C 9/20 340/539.13 |
| 2013/0190981 A1 | 7/2013 | Dolinar | |
| 2014/0114565 A1* | 4/2014 | Aziz | G06Q 10/063 701/425 |
| 2014/0125502 A1* | 5/2014 | Wittkop | G08G 1/127 340/989 |
| 2014/0149305 A1* | 5/2014 | Aziz | G06Q 10/063 705/326 |
| 2014/0188527 A1 | 7/2014 | Oxenham et al. | |
| 2014/0257848 A1* | 9/2014 | Heppding | G06Q 20/3574 705/3 |
| 2014/0313334 A1 | 10/2014 | Slotky | |
| 2015/0198136 A1 | 7/2015 | Martin | |
| 2015/0235094 A1 | 8/2015 | Kraeling | |
| 2016/0018230 A1* | 1/2016 | Neubecker | G01C 21/34 701/537 |
| 2016/0350567 A1 | 12/2016 | McQuade et al. | |
| 2016/0364645 A1* | 12/2016 | Ulloa Paredes | G06N 5/02 |
| 2016/0364699 A1 | 12/2016 | Steketee et al. | |
| 2017/0039782 A1 | 2/2017 | Moeller et al. | |
| 2017/0279957 A1* | 9/2017 | Abramson et al. | H04M 1/72577 |

OTHER PUBLICATIONS

T. Usagawa, Y. Nakashima, Y. Chisaki, T. Nagai and T. Kita, "An attendance management system for Moodle using student identification card and Android device," Proceedings of International Conference on Information, Communication Technology and System (ICTS) 2014, Surabaya, 2014, pp. 199-204. (Year: 2014).*

Schlosser, "Growing GPS, Student Tracking Capabilities Offer More Security Tools," School Bus Fleet, Apr.-May 2015, pp. 30-32.

Truett, "Bus 54 •••Where Are You? a School Bus Intelligent Information System," 1998, 11 pages.

Rossetti, "Field Testing and Evaluation of the Transit Integrated Monitoring System," Aug. 13, 1998, 25 pages.

\* cited by examiner

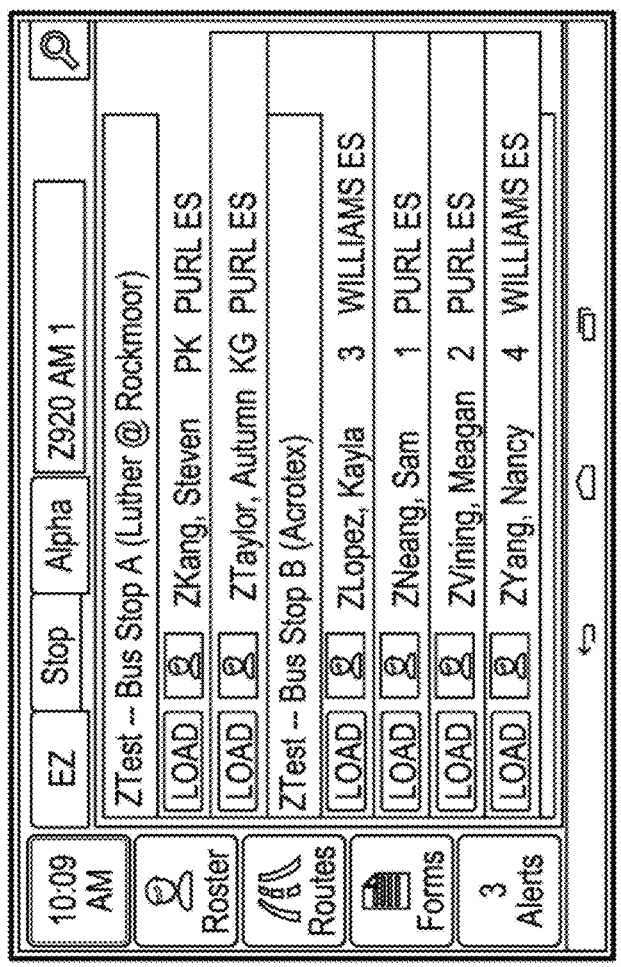
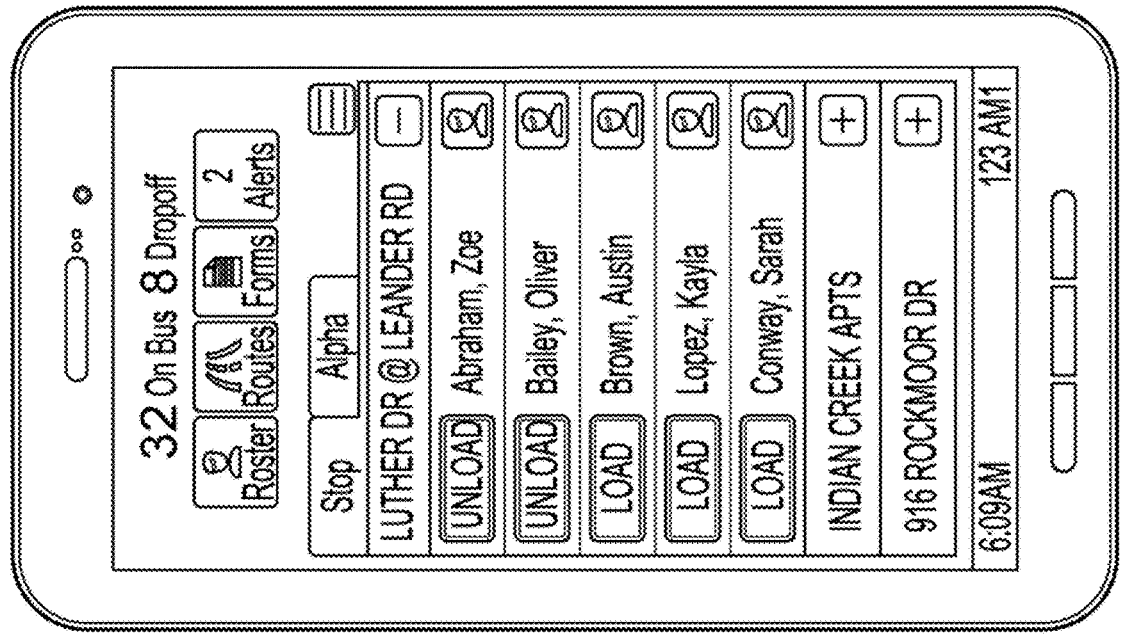
FIG. 6I-1
FIG. 6I-2

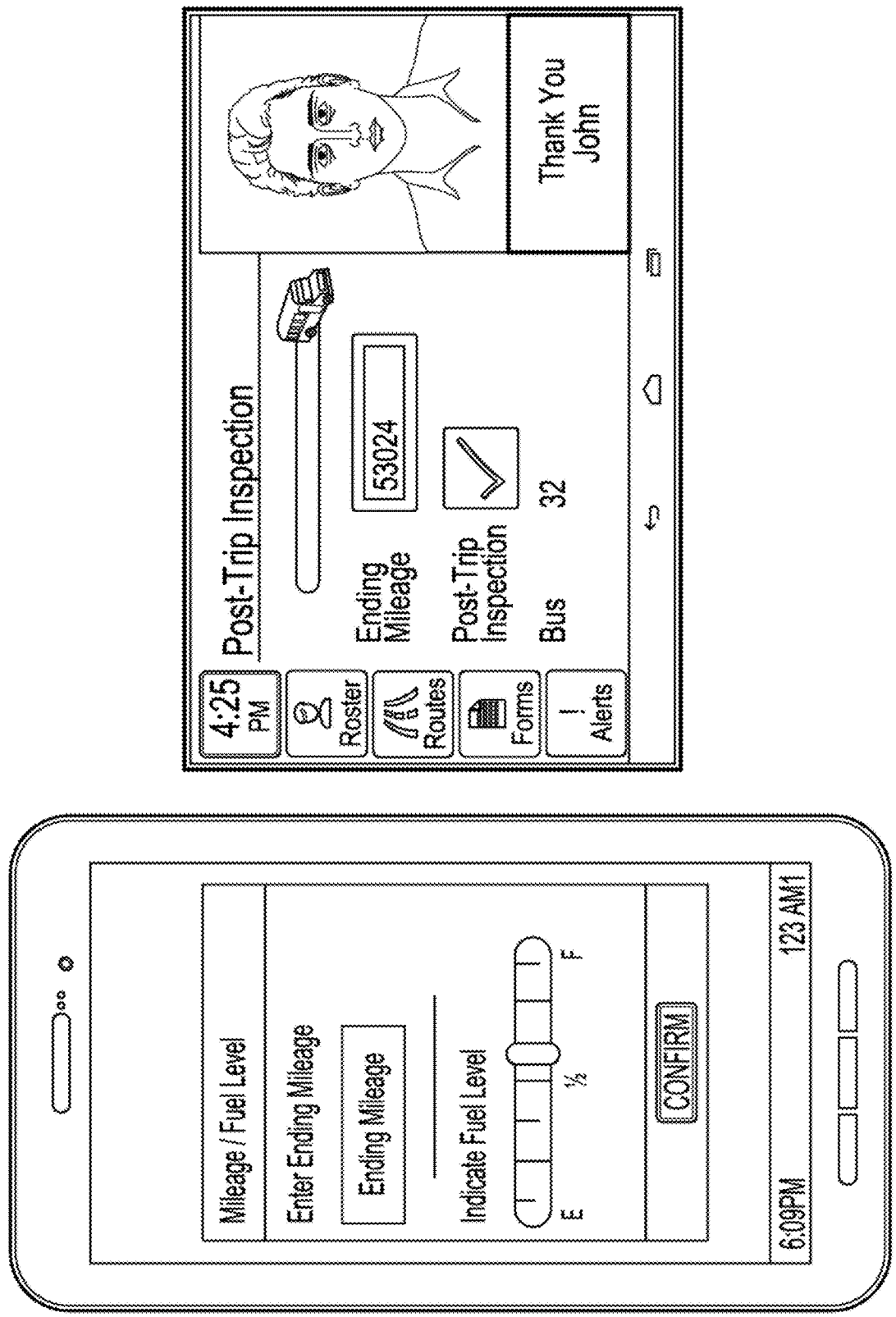

BUS PASSENGER TRACKING

CROSS-REFERENCE TO RELATED APPLICATIONS

This application claims priority to U.S. Provisional Application No. 62/015,226, filed on Jun. 20, 2014, the disclosure of which is expressly incorporated herein by reference in its entirety.

TECHNICAL FIELD

This invention relates to tracking passengers, particularly school students, on buses and other vehicles, particularly on school buses.

BACKGROUND

Since student transportation began, school districts have been challenged with the problem of not knowing which students are on which buses, and bus drivers have struggled with keeping track of their riders and remembering which riders are to embark/disembark at each stop. Schools and transportation departments can receive phone calls several times a week from distraught parents worried about the status of their children, or from parents requesting different transportation arrangements for their children. Systems exist for tracking students as they board school buses, such as using radio frequency identification (RFID) tags carried by each student. Any system that requires much additional action by the driver in the boarding and deboarding process may meet with strong resistance to implementation and can slow buses that must operate on strict route schedules.

SUMMARY

This specification describes methods and systems for monitoring passenger riding status, particularly during events in which the passengers (e.g., students) move from one status to another (e.g., upon boarding or exiting the bus, or upon transfer between buses).

One aspect of the invention features a method of tracking students when a bus is at a bus stop. The method includes determining that a bus has reached a designated stop; presenting on a display a list of students to enter or exit the bus at the designated stop; and, as each student enters or exits the bus: receiving a student identifier from a student identifier system of the student, and in response, moving a name of the student associated with the student identifier to a different position on the display.

In some cases, moving the name of the student includes moving the name to a lower position in the list of students presented on the display.

In some embodiments, the method includes receiving input from a driver selecting one of the students from the list of students, presenting a photo of the selected student and a user interface element for manually boarding or exiting the student; receiving input from the driver selecting the user interface element, and adding or removing the student ID for the selected student from a roster for the bus without receiving the student ID from a student ID system.

In some implementations, the method includes determining that the student associated with the received student identifier is not authorized to enter or exit the bus at the current bus stop, presenting a user interface element on the display to override the lack of authorization, and, in response to the driver selecting the user interface element, adding or removing the received student identifier to or from a roster for the bus.

Determining that the student associated with the received student identifier is not authorized to enter or exit the bus at the designated bus stop can include determining that a school associated with the received student identifier is different from a school associated with the bus, determining that a bus stop associated with the received student identifier is different from the designated bus stop, or determining that the student associated with the received student identifier is suspended. The method can also include presenting a text label to indicate a reason of the lack of authorization for the student on the display, together with a photo of the student or a name of the student.

In response to a student entering or exiting the bus without a student identifier system, the method can include receiving a first input from a driver selecting one of the students from the list of students, presenting a photo of the selected student and a user interface element for manually boarding or exiting the student, receiving a second input from the driver selecting the user interface element, and adding or removing a student identifier for the selected student from a roster for the bus.

In some examples, the method includes receiving a first input associated with a particular student, determining that information in the first input is not within a roster for the bus or not within a student database, presenting a user interface element for manually boarding the particular student, receiving a second input from the driver selecting the user interface element, and adding the information of the first input for the particular student to the roster. Information in the first input can include a name of the particular student and/or a photo of the particular student. The method can also include updating, on the display, a count indicating a total number of students including the particular student on the bus.

While the bus is at the designated stop, the method can include presenting, for each of a first list of students to exit the bus at the designated stop, a first user interface element for manually exiting the student, and presenting, for each of a second list of students to enter the bus at the designated stop, a second user interface element for manually boarding the student. In some examples, the first list is presented on top of the second list on the display, and at least one of names in the first list or names in the second list are in alphabetical order.

Another aspect of the invention features a method of tracking students at bus stops, including determining that a bus has reached a designated stop, presenting on a display a list of students to enter or exit the bus at the designated stop, and, as each student enters or exits the bus: receiving a student identifier from a student identifier system of the student, and in response, determining whether the student is authorized to enter or exit the bus at the designated stop.

The method can include determining that the student is authorized associated with the received student identifier to enter or exit the bus at the designated stop, and in response, moving a name of the student associated with the student identifier out of the list of students presented on the display.

In some implementations, the method includes determining that the student associated with the received student identifier is not authorized to enter or exit the bus at the designated bus stop, and presenting a user interface element on the display to override the lack of authorization. The method can include receiving an input from a driver selecting the user interface element, and in response, adding or removing a name of the student associated with the received student identifier to or from a roster for the bus. The method can also include updating, on the display, a count indicating a total number of the students on the bus. In response to determining that the student is not authorized, the method includes performing at least one alert action such as presenting a visual indication on the display, or playing an audible indication.

Another aspect of the invention features a method of tracking students on a bus, including storing, in an onboard computing device, a list of students associated with respective stops on a bus route, storing, in the onboard computing device, a list of students on the bus, determining that the bus has reached a designated stop, presenting on a display a list of students associated with the designated stop, and, as each student enters or exits the bus: receiving an electronic signal identifying the student entering or exiting the bus and adding or removing the student to or from the list of students on the bus.

In some cases, the method includes moving a feature associated with the identified student to a different position on the display or out of the list of students presented on the display.

In some implementations, the method includes receiving a first input from a driver selecting a student, displaying a photo of the selected student and a user interface element for manually boarding or exiting the student, and in response to a second input from the driver selecting the user interface element, adding or removing the student to or from the list of students on the bus.

In some examples, in response to receiving, as a student enters the bus, a signal identifying the student not associated with the list of students to enter the bus at the designated stop, the method includes presenting a manual load user interface element on the display. In some examples, in response to receiving, as a student exits the bus, an electronic signal identifying the student as a student subject to one or more release authorization restrictions, the method includes displaying an indication of the release authorization restrictions and a release input user interface element.

The method can further include receiving an input from a driver selecting one of the release authorization restrictions, and storing the selected release authorization restriction associated with the student. The method can also include receiving an identifier from an identifier system of a person, determining that the identifier is associated with one of the release authorization restrictions, and presenting an authorization indication on the display to indicate that the person is authorized to pick up the student.

Determining that the bus has reached a designated stop can include monitoring, by using a location system, a current location of the bus; and determining that a distance between the current location and the designated stop is within a predetermined range. The method can also include determining that the bus is leaving the designated stop, automatically updating, on the display, a first count indicating a total number of the list of students on the bus, and automatically presenting, on the display, a second count indicating a total number of a list of students to enter or exit at a subsequent stop on the bus route. In some examples, determining that the bus is leaving the designated stop includes determining, by using a location system, that a distance between a current location of the bus and the designated stop is increasing, or receiving an input from an accelerometer or a door sensor indicating the door is closed. The onboard computing device can include the accelerometer to monitor door open and/or closed events. The door sensor, e.g., a door open/close sensor mounted on the door, can be connected to the onboard computing device, e.g., through a wired connection or a short-range wireless connection. The method can also include presenting an address of the subsequent stop on the display, and presenting an estimate arrival time to the subsequent stop on the display.

The method can include determining, by a location system, that the bus is approaching a particular designated stop, and automatically presenting on the display a list of students associated with the particular designated stop. In some examples, the method includes presenting on the display a list of designated stops on the bus route, receiving an input from a driver selecting a particular designated stop from the list, and presenting on the display a list of students associated with the particular designated stop.

Another aspect of the invention features a method of tracking students on a bus, including storing in an onboard computing device a list of students associated with a particular stop on a bus route, displaying on a screen of the onboard computing device the list of students while students board at the particular stop, monitoring boardings of identified students at the particular stop over a predetermined number of route completions, automatically altering the list of students as a function of the monitored boardings following the predetermined number of route completions, and then displaying on the screen the altered list of students while students board at the stop on a subsequent route.

The method can further include receiving a student identifier from a student identifier system of a student while the student boards at the particular stop on the bus route, determining that the student is authorized to board the bus at the designated stop and that the student is not in the altered list of students, and adding the student to the altered list of students.

Another aspect of the invention features a method of alerting a bus driver of a bus. The method includes determining that the bus is at a designated stop, determining that a first plurality of students are assigned to exit at the designated stop, receiving a second plurality of student identifiers from students exiting the bus at the designated stop, determining that the bus is pulling away from the designated stop, determining that one or more students assigned to exit at the designated stop have not exited the bus, and performing an alert action to alert the driver that the one or more students assigned to exit at the designated stop have not exited the bus.

In some examples, determining that the bus is at a designated stop includes determining that a current location of the bus is with a predetermined range from the designated stop, or determining that a door of the bus is open, e.g., by an accelerometer or a door sensor. In some examples, determining that the bus is pulling away from the designated stop includes determining that a distance between the current location of the bus and the designated stop is increasing, or determining that the door of the bus is closed, e.g., by an accelerometer or a door sensor.

Performing an alert action can include presenting a visual indication, playing an audible indication, emitting a flashing light, or activating an alarm system, for example. Determining that one or more students assigned to exit at the designated stop have not exited the bus can include calculating a difference between a number of the first plurality of students and a number of the second plurality of students, and determining that the difference is larger than zero. The method can also include dynamically presenting the difference on a display.

Another aspect of the invention features a bus computing system configured to perform various operations, including:

maintaining sequential routes for the bus, each route comprising a list of sequential designated stops; determining that the bus is at a last stop for a first route; determining that a trigger event for route transitioning happens; and in response to determining that the trigger event happens, automatically starting a second route sequential to the first route for the bus. The trigger event can include determining that the bus is pulling away from the last stop, determining that a number of a list of students on the bus at the last stop is zero, receiving an input from a driver selecting a user interface element for approving a route transition, or determining that a student boarding the bus is associated with the second route and the student boards the bus at a time within a predetermined time period before a start time of the second route.

In some implementations, the method can include determining that the bus has reached a last stop for a third route and that a number of a list of students on the bus is larger than zero; prompting a window to a driver, the window including a user interface element for approving a route transition; and in response to receiving an input from the driver selecting the user interface element, automatically starting a fourth route sequential to the third route on the computing device.

The method can include presenting, for each of the list of students on the bus, a user interface element for manually exiting the student or keeping the student on the bus.

Another aspect of the invention features a method of tracking students during a bus transfer, the method including maintaining a list of identified students on a computing device on a first bus arriving at a bus transfer location, transferring the list of identified students to a mobile computing device on a second bus at the bus transfer location, presenting on a display of the mobile computing device the list of identified students, and as each student enters the second bus: receiving, on the mobile computing device, an electronic signal identifying the student entering the second bus, determining that the identified student is in the list of identified students, and presenting a visual indication on the display of the mobile computing device to indicate that the identified student has entered the second bus. The method can further include comparing a list of students that have entered the second bus to the transferred list of the identified students to the mobile computing device, and determining whether the bus transfer is completed based on a result of the comparison.

Another aspect of the invention features a method of tracking students by a school paraprofessional. The method includes receiving a list of identified students for a bus on a mobile computing device associated with a paraprofessional, determining that the bus has reached a transfer location, and presenting on a display of the mobile computing device the list of identified students. A each student checks in with the paraprofessional, the method includes receiving, on the mobile computing device, an electronic signal identifying the student checking in with the paraprofessional, determining that the identified student is in the list of identified students, and presenting a visual indication on the display of the mobile computing device to indicate that the identified student has checked in. The method can include updating on the display of the mobile computing device a number of students that have checked in.

In some implementations, the method includes receiving input from the paraprofessional selecting one of the list of students on the display, presenting on the display one or more released authorization restrictions associated with the selected student, receiving input from the paraprofessional selecting one of the released authorization restrictions, and recording that the selected student has been released to the selected released authorization restriction. The method can further include updating on the display of the mobile computing device a number of students that have been released.

Particular embodiments can be implemented so as to realize one or more of the following advantages. A bus system, e.g., an onboard computing device such as a tablet computer or a smart phone, can record when and where students get on and off their designated buses and stops. Using RFID technology and cloud-connected computers/servers can provide accurate, real-time information in a secure way to bus drivers, school administrators, and parents/guardians. The bus system can assist bus drivers to efficiently and safely perform their responsibilities, e.g., verifying and logging loading and unloading events, automatically generating seating charts, student discipline reports, emergency notification, and maintenance requests based on pre- and post-trip inspections, including verification of a fuel level. The bus system can also enable the bus drivers to manually load or unload unauthorized students or anonymous students, e.g., students that have not registered to ride the bus. The bus system can help ensure authorized ridership, which results in increased safety and security of students who utilize school bus transportation. The bus system can be a single hardware device to accomplish functionalities including student tracking (e.g., with built-in NFC or barcode reader), GPS tracking (e.g., with built-in GPS sensor), pre- and post-trip inspections (e.g., with user interface (UI) and cameras), cellular modem, and/or wireless networking to external sensors or devices. The bus system can be cost-effective, convenient, and easy to install and use.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 6A-1 to 6R show screen shots of an example graphical user interface (GUI) for a driver application.

FIGS. 7A to 7F show screen shots of an example graphical user interface (GUI) for a paraprofessional application.

Like reference symbols in the various drawings indicate like elements.

DETAILED DESCRIPTION

Figure 1:
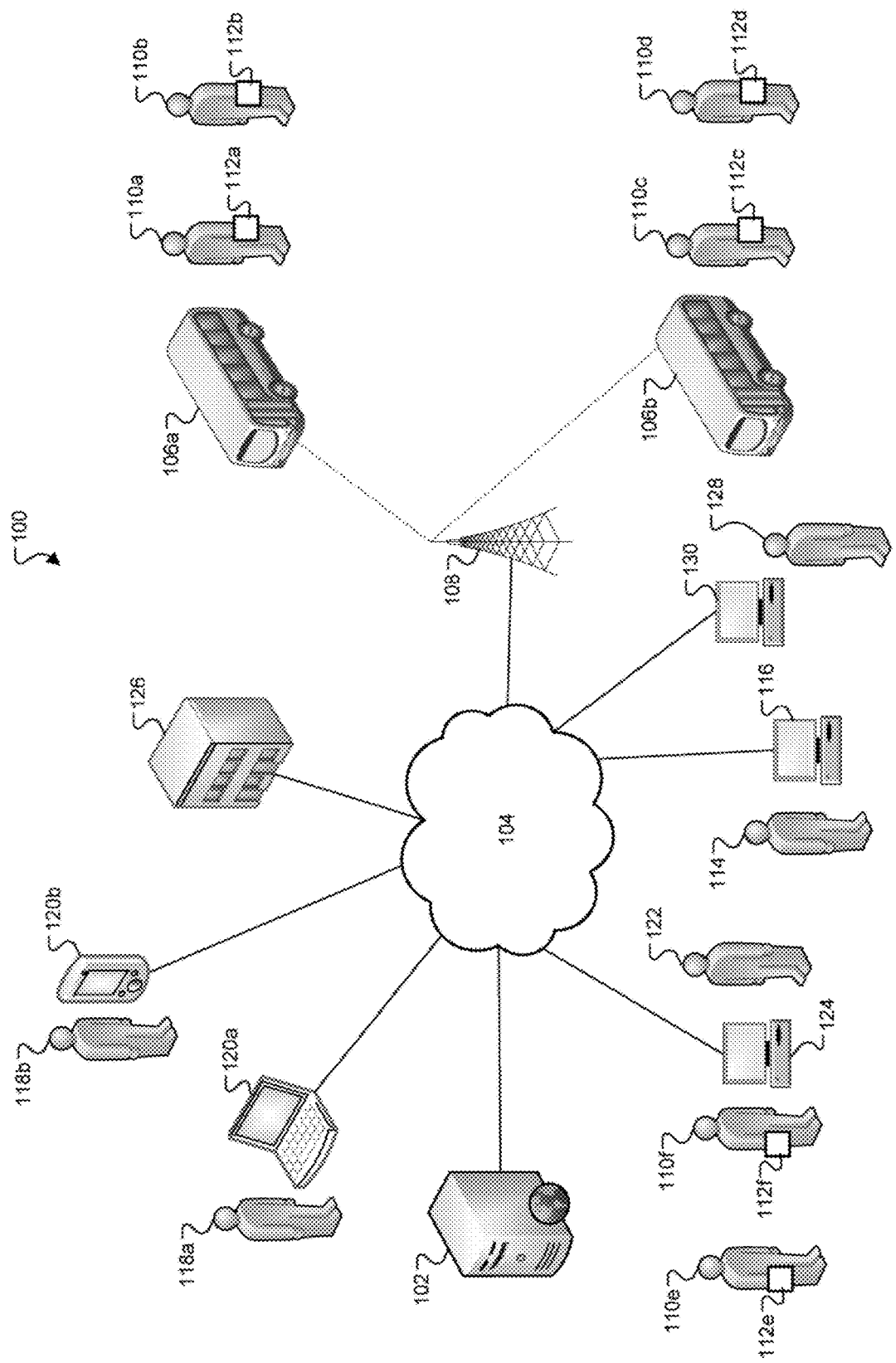
FIG. 1 is a diagram of an environment for monitoring student activities.

FIG. 1 is a diagram of an environment 100 for monitoring student activities. The environment 100 includes a student accountability system 102 which can be a server system of one or more computers configured to communicate over a data communications network 104, e.g., the Internet. FIG. 1 illustrates an overview of the environment, and other figures show components of the environment in greater detail.

The student accountability system 102 communicates over a wireless network 108, e.g., a cellular network such as 3G/4G internet connection, with bus systems 106*a-b* that are on school buses. Students 110*a-d* board the buses with student identification (ID) systems 112*a-d*. The bus systems 106*a-b* identify student IDs from the student ID systems 112*a-d*. The bus systems 106*a-b* can determine locations of the buses, e.g., using global positioning system (GPS) technology, and report location information and student status information to the student accountability system 102.

The student accountability system 102 provides an administrator portal to a school administrator 114. The school administrator 114 can access the portal with a user device 116, e.g., a personal computer, tablet, or phone. The user device 116 is connectable to the portal via the network 104 and/or the wireless network 108. Through the administrator portal, the student accountability system 102 can provide information describing where the buses are and which students are on which buses. The student accountability system 102 can also provide student riders and bus activity reports, exception reports, driver/route updates, and alerts. The school administrator 114 can manage bus routes and students associated with individual stops and send bus drivers alerts or notices that are associated with the bus drivers, the buses, the bus routes, and/or the students on their buses. For example, the school administrator 114 can add or remove individual students on a bus or determine active student riders or suspended students.

The student accountability system 102 provides a parent portal to parents/guardians 118*a-b* of the students. The parents/guardians 118*a-b* access the portal with user devices 120*a-b*, e.g., personal computers, tablets, or phones. Through the parent portal, the student accountability system 102 can provide information describing a particular student's location, the location of a particular bus that the student is riding, or estimated arrival time for the particular bus to a designated stop. The parents/guardians 118*a-b* can access up-to-date boarding activity and bus on route activity, and receive alerts (e.g., in emails or text messages) that include bus schedule changes, bad weather notifications, notification of emergencies, and/or their children boarding or missed boarding. The parents/guardians of a particular student may be restricted to access information only associated with the particular student and prohibited to access information associated with other students.

The parents/guardians can use the parent portal to manage notification settings and communicate with the school administrator 114, e.g., for updating contact information, submitting an address change, adding or removing individuals authorized to pick up their children, or temporary schedule change. In some examples, the parents/guardians can use an application executed on the user devices 120*a-b* to take photos and upload the photos the student accountability system 102. The application can be configured to guide a user to take photo properly, e.g., outlining head and shoulders. The student accountability system 102 can associate the photos of the parents/guardians with their student riders, e.g., based on the parents/guardians' accounts on the student accountability system 102. A school administrator can review the photos and approve or disapprove the photos. The photos of the parents/guardians can be provided to the bus systems 106*a-b*. As discussed in further details below, a driver of a bus can verify a person to pick up a student by using the photos of the authorized parents/guardians associated with the student that are stored in a bus system 106 of the bus.

The student accountability system 102 can also provide a paraprofessional portal to a school paraprofessional 128. The school paraprofessional 128 can access the paraprofessional portal with a paraprofessional application installed on a user device 130, e.g., a mobile computing device such as a tablet or a smart phone, or a personal computer or notebook. The user device 130 is connectable to the paraprofessional portal via the network 104 and/or the wireless network 108. Through the paraprofessional portal, the student accountability system 102 can provide information associated with the paraprofessional 128, including a list of buses and rosters for respective buses or routes. The student accountability system 102 can also provide information describing where the buses are and which students are on which buses, student riders and bus activity reports, exception reports, driver/route updates, and alerts.

As discussed in further details below, once the school paraprofessional 128 logs on the paraprofessional application and/or the student accountability system 102 on the user device 130, the paraprofessional application can present associated information the school paraprofessional 128. The associated information can be downloaded, e.g., automatically, from the student accountability system 102 via the network 104 and/or the wireless network 108. In some cases, the school paraprofessional 128 can use the user device 130 to check in and/or release students on the buses. For example, a bus arrives a transfer location such as a school. The school paraprofessional 128 can use the paraprofessional application on the user device 130 to download, e.g., from the student accountability system 102, up-to-date information about the bus and a list of students on the bus or a roster for the bus or the bus route. In some examples, the school paraprofessional 128 can also use the paraprofessional application on the user device 130 to receive the up-to-date information from an onboard computing device on the bus, e.g., through a near-field communication (NFC) or the network 104 and/or the wireless network 108.

The school paraprofessional 128 can use the paraprofessional application to check in a list of students that exit at the school using the paraprofessional application on the user device 130. The school paraprofessional 128 can also use the paraprofessional application on the user device 130 to release students to parents/guardians who pick up the students at the transfer location. In some implementations, the user device 130 includes an identifier reader, e.g., a RFID reader or a barcode reader, which can be used to detect student identifiers or identifiers for the parents/guardians.

The student accountability system 102 can also provide additional student services using another school system 124. The other school system 124 can be, e.g., a computer system in a cafeteria that students use to purchase food. Parents 118*a-b* can use the parent portal to add credits to a student's account, e.g., using a credit card or other payment system. The other school system 124 can also be, e.g., a computer system in a library that students use to check out books. The students 110*e-f* can use their student ID systems 112*e-f* to check out books and/or purchase food at the cafeteria.

The student accountability system 102 can also provide additional student services using a campus system 126. The campus system comprises one or more student ID readers positioned in or near campus areas or buildings or rooms. The student ID readers can communicate with the student accountability system 102 over the network 104, e.g., using a wireless local area network (LAN) or the cellular network 106. The student ID readers report student IDs to the student accountability system 102 as students pass by the student ID readers carrying student ID systems. Using student ID readers positioned in doorways and walkways, the student accountability system 102 can aid parents and administrators in locating students on a campus or within buildings.

The environment in FIG. 1 is described with reference to parents, students, and school administrators. The technology described in this document can also be applied in other settings. For example, the technology can be used to track passengers or cargo in other transportation environments.

Figure 2:
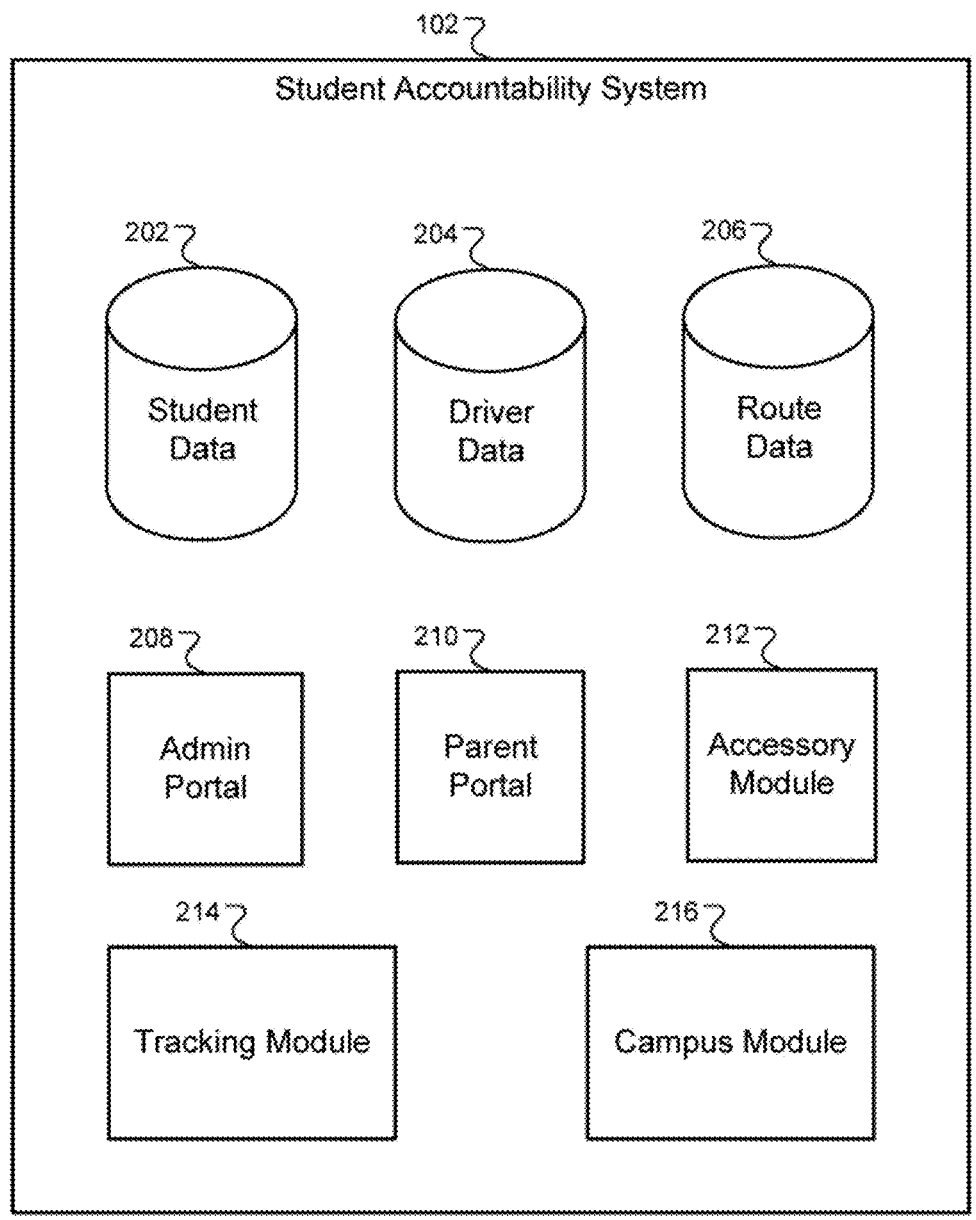
FIG. 2 is a block diagram of an example student accountability system.

FIG. 2 is a block diagram of an example student accountability system 102. The student accountability system 102 can be implemented using a server system of one or more computers which can be distributed, e.g., within a data center or across different geographic regions using a network.

The system stores student data 202, driver data 204, and route data 206. The system includes executable software modules including an administrator portal 208, a parent portal 210, and an accessory module 212. The system also includes a tracking module 214 which receives location and student status information from bus systems 106*a-b* and provides relevant information to the parent portal 210 and the administrator portal 208. The system includes a campus module 216 to interface with the campus system 126 that includes one or more student ID readers positioned in different locations on a campus, e.g., in doorways to rooms or buildings or walkways.

The student data 202 can be populated by an administrator 114, by parents/guardians 118*a-b*, or a combination of both. For example, parents/guardians 118*a-b* can be instructed to log in to the parent portal 210 to populate the student data 202 with information about their students. Administrators can populate the student data 202 with data from parents who are unable or do not wish to access the parent portal 210.

The student data 202 can include a unique student identifier (ID) for each student. The IDs can be generated by the system 102 or by an administrator 114. Each student ID can be associated in the student data 202 with a student's name and other optional information, e.g., one or more photographs of the student. Each student ID is associated with one or more bus routes stored in the route data 206. Each student ID can also be associated with one or more parent or guardian names and with contact information for parents or emergency contacts or for others.

In some implementations, as discussed in further detailed below, some student IDs are associated with a list of individuals who are authorized to receive a student who is leaving a bus. The list can be displayed to a driver using a display device of a bus system 106 so that the driver can confirm that a student is being released to an authorized individual.

The driver data 204 is typically populated by the administrator 114 and includes a unique ID for each driver who will be driving in the administrator's school system. Each driver ID is associated with one or more routes in the route data 206 that the driver will be driving on. The driver IDs can be associated with other information, e.g., a log of completed driver status checks.

The route data 206 is typically populated by the administrator 114. The route data 206 specifies a number of routes for the buses to complete to pick up and drop off students for going to and from schools. The route data can be specified using the administrator portal 208. For example, the administrator portal can present a map in a graphical user interface to the administrator 114, and the administrator 114 can then drop pins on the map to specify the route. The administrator can also assign driver IDs to the routes to specify which drivers are driving which routes.

The administrator portal 208 provides an administrator 114 with relevant information from the tracking module 114. For example, the administrator portal 208 can display the locations of multiple buses in the school system and lists of students on the buses. The parent portal 210 provides parents/guardians 118*a-b* with relevant information to the parents' students from the tracking module 114. For example, the parent portal 210 can provide a parent with the location of the bus that the parent's student is riding.

The accessory module 212 is configured to interface with another school computer system. For example, the accessory module 212 can communicate with a cafeteria computer system or a library computer system. A parent can log into the parent portal 210 and add cafeteria credits to a student's account and see what books the student has checked out from the library and when the books are due to be returned.

The tracking module 214 receives location information and student status information from the bus systems 106*a-b*. For example, the tracking module 214 can receive location coordinates from the bus systems 106*a-b*, lists of students that are riding the buses, and lists of students that have been dropped off at designated stops. The tracking module 214 provides relevant information to the administrator portal 208 and the parent portal 210.

The campus module 216 receives student IDs from student ID readers that are positioned around a campus or building. As students pass by the student ID readers, the student ID readers read student IDs from the students' ID systems and send the student IDs to the campus module 216. The campus module 216 stores information associating each student ID reader with a geographic location. An administrator or parent, using the admin or parent portal, can determine the location of a student by observing the last recorded location of the student's ID by the campus system.

Figure 3A:
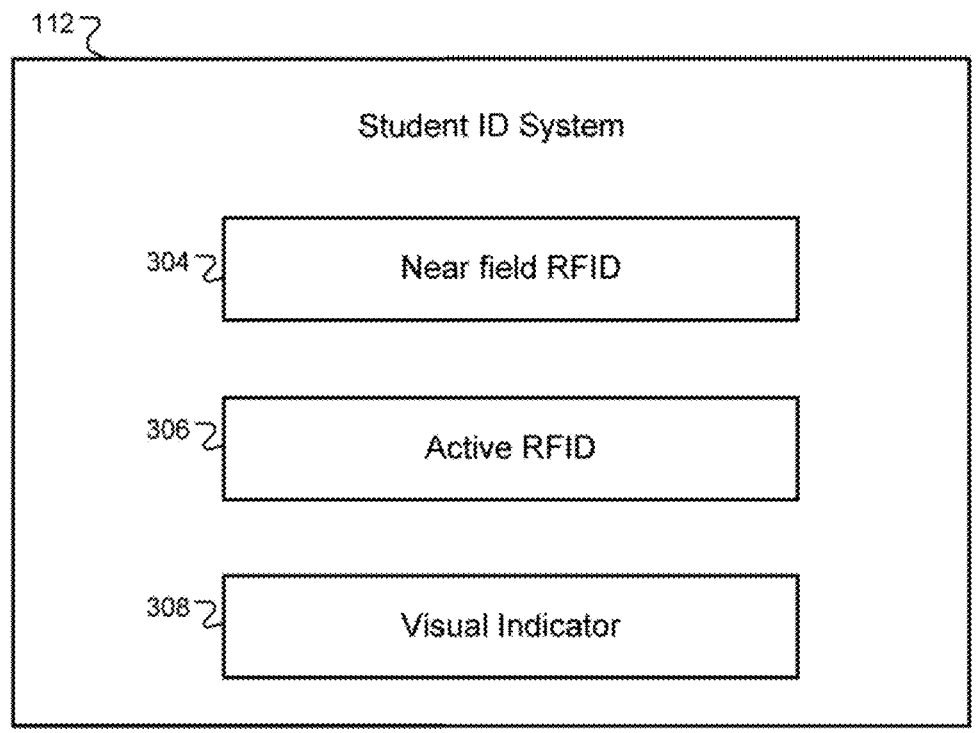
FIG. 3A is a block diagram of an example student ID system.

FIG. 3A is a block diagram of an example student ID system 112. The student ID system 112 can include one or more types of identifiers. Each of the identifiers can provide the same unique student ID for a given student. The student ID system 112 can be contained in any appropriate container, e.g., a card that a student can keep in a pocket, a card attached to a lanyard that goes around the neck, or in a wristband module.

In some examples, the student ID system 112 includes a near-field RFID module 304. The near-field RFID module is energized by an RFID interrogator when the student ID system is presented to the RFID interrogator. In some examples, the student ID system includes an active RFID module 306, which includes a power source and is capable of transmitting the unique student ID without being energized by an interrogator. The student ID system 112 includes a visual indicator 308 of the unique student ID. The visual indicator 308 can be a bar code or a quick response (QR) code or even printed characters that express the unique student ID.

In some implementations, the student ID system 112 contains no student information but a digital code. When the student ID system 112 is presented to a RFID reader in the bus system 106, the RFID reader can identify the digital code and the bus system 106 can pull up the student information associated with the digital code that is stored in the bus system 106, e.g., an onboard tablet computer.

The student can use the active RFID module 306 when boarding a bus, e.g., so that students do not have to individually swipe their IDs as the board. In that example, the bus system 106 can poll the students' ID systems after all the students have boarded to improve boarding time. Alternatively, students can use the near-field RFID module 304 while boarding the bus, e.g., so that the driver can individually confirm every student as the students board.

Additionally or alternatively, students can use the active RFID module with the campus system 126. For example, the campus system can include RFID interrogators within a number of classrooms, and an administrator can get the student IDs of the students in a given classroom by polling the student ID systems of the students in the classroom.

Figure 3B:
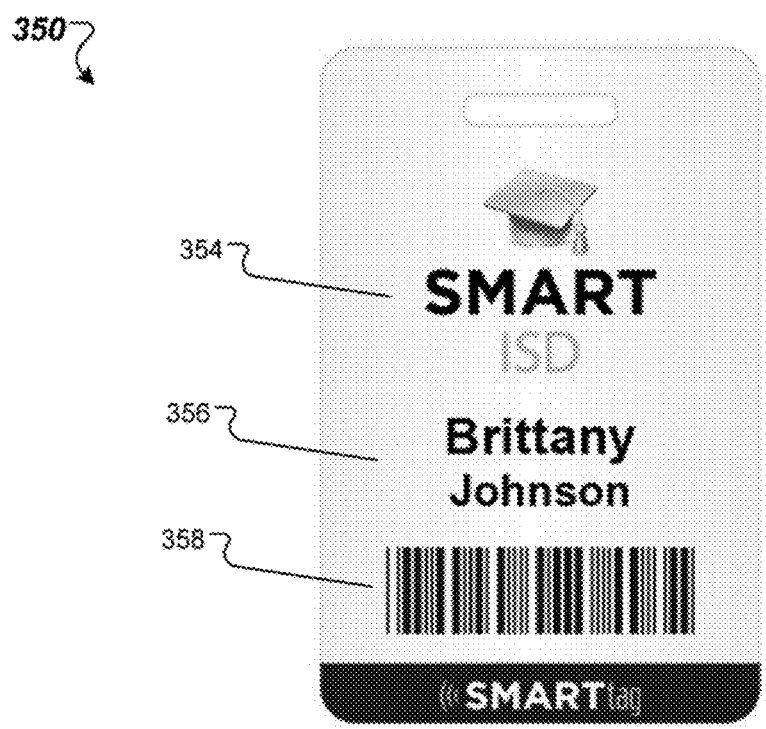
FIG. 3B shows a screen shot of an example student ID system.

FIG. 3B shows an example student ID system 350 of a student. The student ID system 350 can be the student ID system 112 of FIGS. 1 and 3A. The student ID system 350 includes a school district 354 that the student is in, a name of the student 356, and a visual indicator 358 (e.g., the visual indicator 308 of FIG. 3A). For illustration, the visual indicator 358 is a bar code. The student ID system 350 can also include a near-field RFID module (e.g., the RFID module 304 of FIG. 3A) or an active RFID module (e.g., the RFID module 306 of FIG. 3A) embedded in the student ID system 350.

Figure 4:
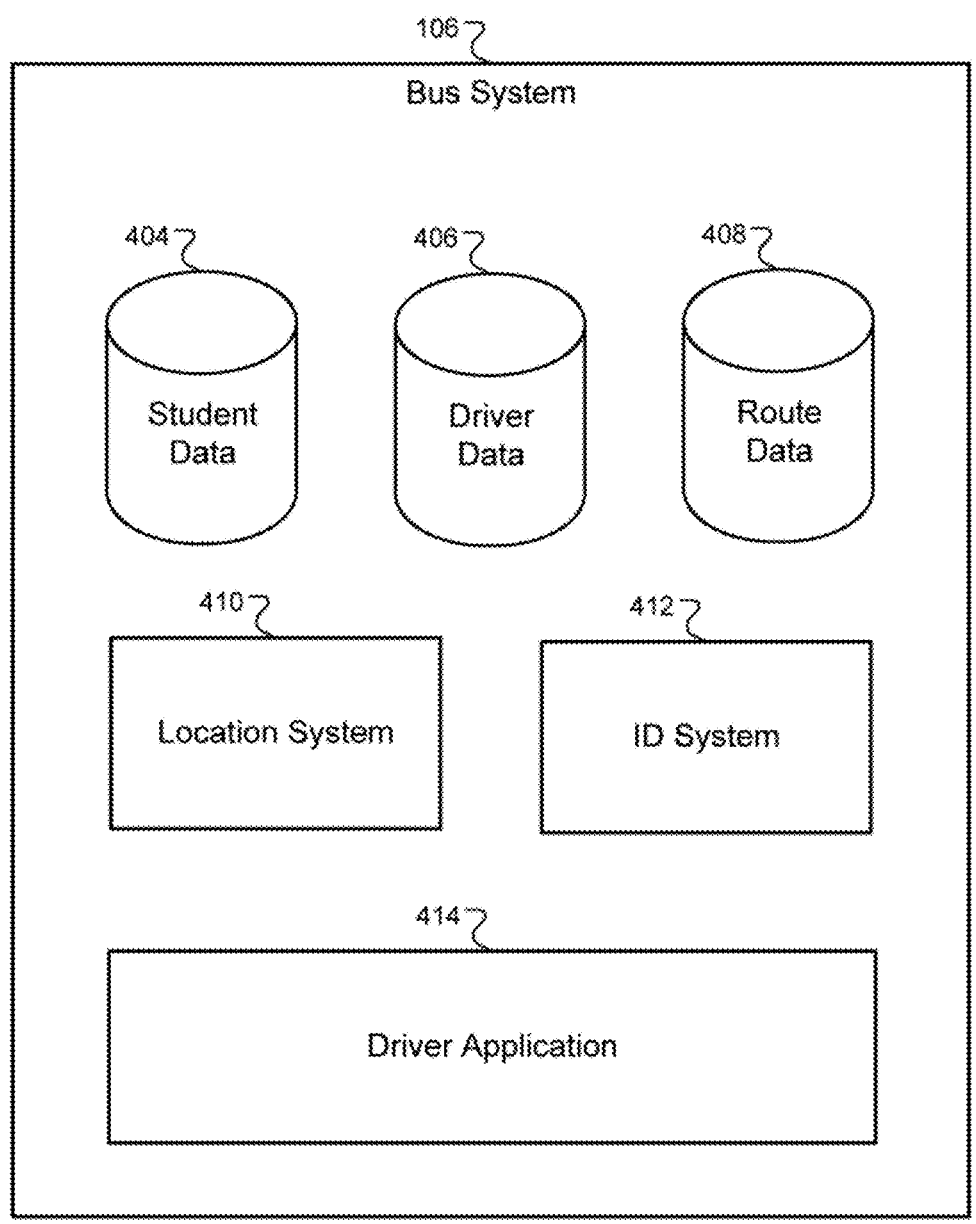
FIG. 4 is a block diagram of an example bus system.

FIG. 4 is a block diagram of an example bus system 106. The bus system 106 can be any appropriate computer system, e.g., a laptop or a personal computer or a smart phone or a tablet computer. For purposes of illustration, the bus system 106 will be described as being a tablet computer having a touch screen display.

The bus system 106 can be attached to the bus or carried by the bus driver. In some implementations, the bus system 106 is mounted at the front of the bus, between the driver and the bus door. A tablet cradle and mounting bracket system can be secured to the bus, and the bus system can be mounted or removed by sliding or pushing the bus system into the tablet cradle device. Students can present a student ID system 112 to the bus system while entering or exiting the bus. The driver can see the display and reach the display to perform any needed functions, e.g., manually loading or unloading a student, and the driver can remove the bus system 106 if needed, e.g., to perform a vehicle inspection before starting a route and/or after completing a route.

The bus system 106 stores student data 404, driver data 406, and route data 408. In some implementations, the bus system 106 only stores the student, driver, and route needed for a particular route or number of routes to be completed on a given day. The bus system 106 can download the needed information from the student accountability system 102, e.g., over the cellular network 108, when a driver logs into the bus system 106. The bus system 106 can also update information, e.g., real-time location or student loading or unloading events, to the student accountability system 102.

The bus system 106 includes a location system 410 and an ID system 412. The location system 410 is configured to determine a location of the bus system, e.g., using GPS or by any other appropriate locating technology. The ID system 412 is configured to receive student IDs from the student ID systems 112a-d and can also be used to identify drivers who carry driver ID systems. The ID system 412 can be also configured to identify identifiers of parents/guardians who are authorized to pick up their students. In some implementations, the ID system 412 includes an RFID interrogator, a bar code reader, or a near field communication (NFC) reader.

The bus system 106 includes a driver application 414. The driver application 414 is configured for rapid boarding of students and accurate reporting. For example, when a student boards or disembarks a bus, the student can present the student ID system 112, e.g., a student ID card, to the ID system 412. The ID system 412 can identify the student ID and provide the identified student ID to the driver application 414. The driver application 414 can log the boarding event, e.g., recording timestamp, location and student information, and verify whether or not the student is authorized to board or whether or not the student is getting off at a correct stop.

The driver application 414 provides manually loading and/or unloading functionalities to a driver, so that the driver can use the driver application 414 to manually load or unload a student rider, e.g., an anonymous student or an eligible student that forgets to bring his/her student ID system 112. The driver application 414 can provide flexible functions to the driver. For example, the driver application 414 can provide a "one click" manually loading or unloading feature to the driver. The driver can simply click a student name to complete the manually loading or unloading process. The driver application 414 can also add an "undo" button for the driver to cancel previous actions such as manually loading or unloading.

The driver application 414 can send information to the student accountability system 102, which can in turn send out alerts. For example, the student accountability system 102 can send out an alert to everyone on a list associated with a student ID when the student's bus is a certain amount of time from arriving as the student's designated stop.

As discussed in further details below, the driver application 414 can perform automatic route transitioning. For example, suppose that a bus covers two routes in a morning, one to an elementary school and one to a middle school. After all of the students have been dropped off at the elementary school, the bus driver starts driving the route for the middle school students. The driver application 414, using the location module, can determine that the bus has started the later route and automatically load route data for the later route.

The driver application 414 can also be used in a route learning mode. The routes stored in the route data can be created by a school administrator dropping pins onto a map displayed by a mapping application, and in some cases, the stop locations will not be correct. In the route learning mode, a driver can drive to all of the stops on the route, push a button when the bus is located at a stop, and have the driver application 414 record a precise location of the bus at the stop. The route data in the student accountability system can then be updated with the recorded locations.

The driver application 414 can allow a driver to perform a pre-trip inspection and/or a post-trip inspection. The pre-trip inspection and the post-trip inspection can be performed as described in a U.S. patent application Ser. No. 14/746,451, entitled "VEHICLE INSPECTION" and filed on the same date herewith, whose contents are hereby incorporated by reference in their entirety. In some implementations, the driver application 414 can validate whether or not a pre or post trip inspection has been completed by the driver. The driver application 414 uses location information and time stamp information to validate the inspection. For example, the driver application 414 can generate a flag or a report for an administrator if the location module indicates that the bus system stayed in the same location while the driver enters information as part of the inspection. In some examples, fixed Areas are designated around the bus. As the driver performs the inspection, the driver selects a user interface element displayed by the driver application, and the driver application checks whether the location module indicates that the driver is in the correct Area for that stage of the inspection.

Figures 2, 6A:
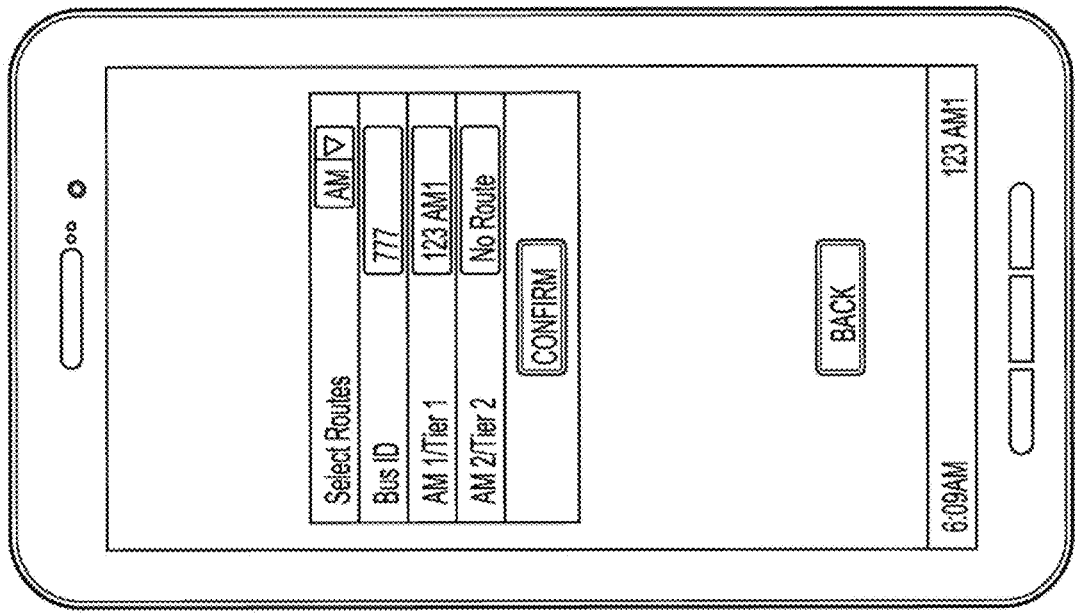
Figures 1, 6A:
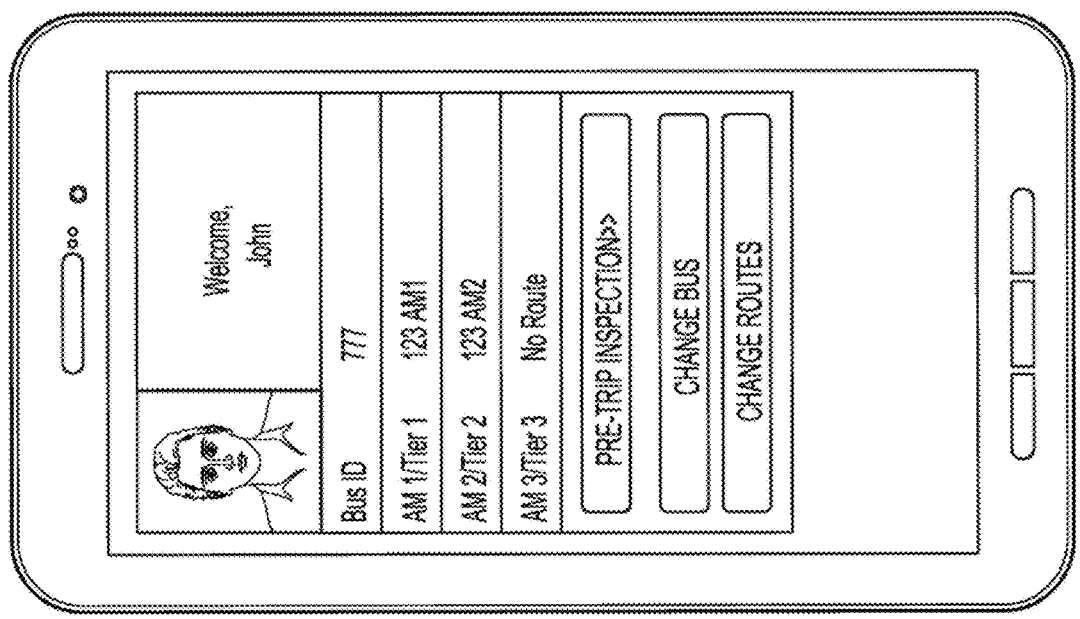
Figures 3, 6A:
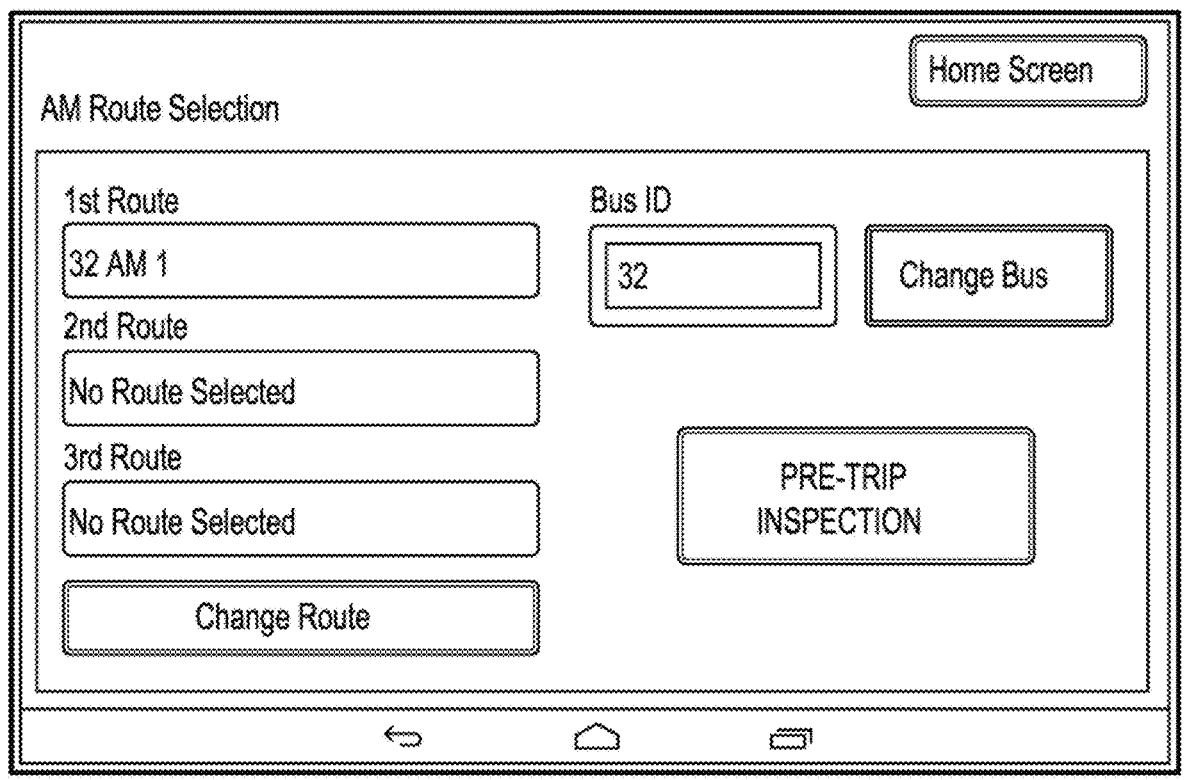

The driver application 414 is configured to present a graphical user interface (GUI) to a driver, e.g., on a display of an onboard computing device. The GUI can be presented in vertical view or horizontal view. As discussed in further details below, FIGS. 6A-6O show screen shots of an example GUI for the driver application and illustrate example functions that can be performed by the driver application 414.

In some implementations, the bus system 106 includes a recording system such as a video recorder, an audio recorder and/or a camera. The driver application 414 can receive a driver input or determine a trigger event to activate the recording system to record events such as emergency events or student discipline events. In some implementations, the recording system is enabled to record whenever active. The recording system can be activated in response to trigger events such as student load activity, profanity detected, or keyword threatening. The trigger events can also set markers in recording stream. In some implementations, secondary recording system such as microphones or cameras or video recorders can be positioned around the bus and wired or wirelessly coupled to the bus system 106 for audio and/or video recording. The driver application 414 can process the recorded audio or video files, e.g., by compressing the files or retrieving useful video/audio clips. The bus system 106 can then transmit the processed files to the student accountability system 102.

The driver application 414 can have different operating modes for different drivers. The operating modes can include a normal mode, e.g., for a primary driver such as an experienced driver that has become familiar with the driver application 414, and a training mode, e.g., for a substitute driver such as a new driver to use the driver application 414. In the normal mode, the driver application 414 provides flexibility for a driver to automatically or manually perform actions. In the training mode, the driver application 414 prohibits some functions, e.g., the "one click" manually loading/unloading feature or alerts for unauthorized loading or unloading. The driver application 414 can also allow a primary driver to customize settings in the normal mode and prohibit a substitute driver to make customized settings in the training mode.

The driver application 414 on a bus can determine whether a driver logging in the driver application 414 is a primary driver for the bus or a substitute driver for the bus, e.g., based on the driver's identifier. If the driver application 414 determines the driver is a primary driver for the bus, the driver application 414 operates in the normal mode. If the driver application 414 determines the driver is a substitute driver for the bus, the driver application 414 operates in the training mode.

FIGS. 5A-5D show example processes that can be executed in accordance with implementations of the present disclosure. Each of the processes can be implemented by a bus system such as an onboard computing device in a bus. For example, each process can be implemented by the bus system 106 shown in FIGS. 1 and 4, e.g., by the driver application 414 of the bus system 106. The example processes can be implemented using additional, fewer, or different operations, which can be performed in the order shown or in a different order. In some implementations, one or more of the operations can be repeated or iterated, for example, until a terminating condition is reached.

Figure 5A:
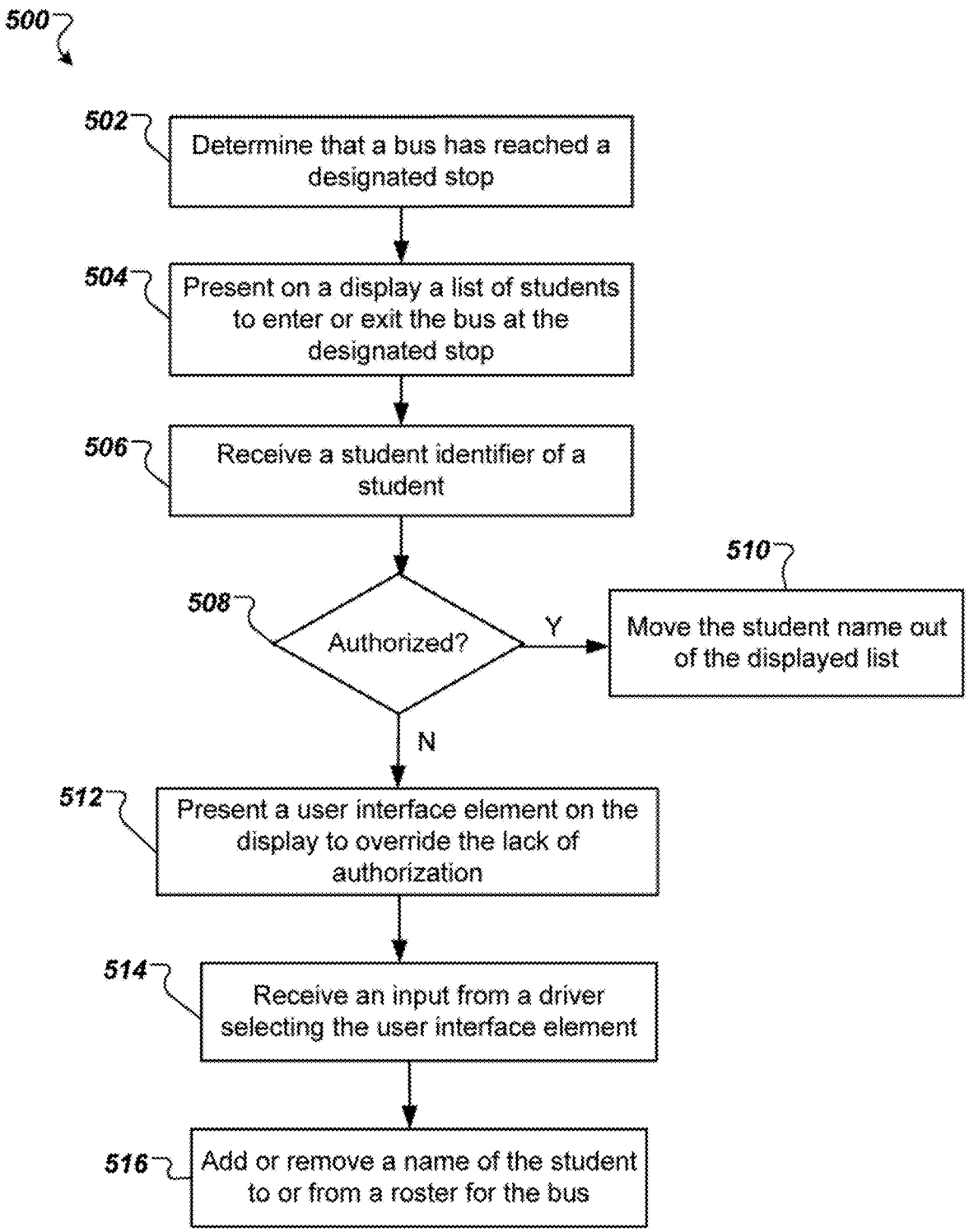
FIG. 5A is a flow diagram of an example process for tracking students at bus stops.

Referring to FIG. 5A, an example process 500 for tracking students at bus stops is shown. The bus system determines that the bus has reached a designated stop (502). A driver may drive the bus on a predetermined bus route that includes a number of sequential designated stops. Each designated stop is associated with a physical address. The bus system can use a locating system, e.g., the locating system 410 of FIG. 4, to monitor a current location of the bus. When a distance between the current location and the physical address of the designated stop is within a predetermined range, e.g., a 50-meter radius, the bus system can determine that the bus has reached the designated stop.

The bus system presents on a display a list of students to enter or exit the bus at the designated stop (504). The display can be a touch screen display of the bus system or an external monitor coupled to the bus system. Each of the list of students is associated with the designated stop. Information on the list of students can be pre-stored in the bus system, e.g., by downloading from a student accountability system, e.g., the student accountability system 102 of FIG. 1. The pre-stored information can include a student profile such as name, address, a photo, associated school/campus, grade, stop, and/or seat number/assignment in the bus, a medical profile, and/or assistance information. The information on the list of students can be provided by a school administrator, e.g., the school administrator 114 of FIG. 1. For example, the school administrator can schedule or determine which bus, which bus route, which stop, and/or which seat a student is associated with.

In some examples, the displayed list of students includes a list of students to enter the bus at the designated stop, e.g., when the bus picks up students to school in the morning. In some examples, the displayed list of students includes a list of students to exit the bus at the designated stop, e.g., when the bus drops off students back to home in the afternoon. In some examples, the displayed list of students includes a first list of students to exit the bus at the designated stop and a second list of students to enter the bus at the designated stop, e.g., when the first list of students gets back from morning classes and the second list of students goes to afternoon classes. The first list of students to exit the bus can be presented on top of the second list of students to enter the bus. Within the first or second list of students, names of the students can be in alphabetic order.

As discussed in further details below, the bus system can provide manually loading and/or unloading functionalities for the driver. For each student to exit the bus at the designated stop, the bus system can present a user interface element that the driver can select to manually exit the student. For each student to enter the bus at the designated stop, the bus system can present a user interface element that the driver can select to manually load the student.

As each student enters or exits the bus, the bus system receives a student identifier from a student identifier system of the student (506). The student identifier (ID) system can be the student ID system 112 of FIGS. 1 and 3. The student ID system can include a RFID module, e.g., the near field RFID module 304 or the active RFID 306 module of FIG. 3A. When a student enters or exits the bus, the student can present the student ID system to the bus system, and the bus system receives the student identifier from the student ID system, e.g., by using a RFID reader in the bus system or externally coupled to the bus system.

The bus system determines whether or not the student is authorized to enter or exit the bus at the designated stop (508). The bus system can pre-store information about the list of students. The pre-stored information can include respective student identifiers for the list of students. The bus system can determine whether or not a student is authorized to enter or exit the bus at the designated stop by determining whether the received student identifier associated with the student is in the pre-stored list of students.

If the bus system determines that the student is authorized to enter or exit the bus at the designated stop, the bus system can move a name of the student associated with the student identifier out of the list of students presented on the display (510). In such a way, the driver of the bus can focus on the other students that haven't entered or exited the bus. The bus system can also move the name of the student to a lower position in the list of students presented on the display. In some implementations, the bus system presents a visual indication or emits an audible indication to show that the student is authorized to enter or exit the bus at the designated stop.

In some implementations, the bus system presents a count on the display for indicating a total number of a list of students on the bus. When the bus system determines that the authorized student has entered or exited the bus at the designated stop, the bus system can add or remove the authorized student to the list of students on the bus. The presented count can dynamically increase or decrease correspondingly. In some implementations, the bus system presents another count on the display for a total number of students to enter or exit the bus at the designated stop. When a list of students that have entered or exited the bus is identical to the pre-stored list of students to enter or exit the bus at the designated stop, the presented list of students to enter or exit the bus at the designated stop can become zero. The bus system can also give a visual indication or an audible indication to the driver that loading or unloading students at the designated stop has successfully completed.

If the bus system determines that the student associated with the received student identifier is not authorized to enter or exit the bus at the designated stop, the bus system presents a user interface element on the display to override the lack of authorization (512). For a student to enter the bus, the bus system can present a user interface element, e.g., "load," for manually loading the student, and a user interface element, e.g., "do not load," for not manually loading the student. For a student to exit the bus, the bus system can present a user interface element, e.g., "unload," for manually unloading the student, and a user interface element, e.g., "keep on the bus," for manually keeping the student on the bus. In some cases, the bus system determines that the student is not authorized by determining that a school associated with the received student identifier is different from a school associated with the bus. In some cases, the bus system determines that the student is not authorized by determining that a bus stop associated with the received student identifier is different from the designated stop. In some cases, the bus system determines that the student is not authorized by determining that the student associated with the received student identifier is suspended, e.g., during a time period.

In some implementations, the bus system presents a text label on the display to indicate a reason of the lack of authorization for the student, together with information of the student including a photo of the student, a name, and/or associated school or stop. The text label can be "wrong school," "wrong stop," or "suspended" with the suspended time period. The bus system can also alert the driver, e.g., by a visual indication, an audible indication, or emitting a flashing light.

The bus system receives an input from a driver selecting the user interface element (514). In some examples, the driver selects the user interface element by pressing the user interface element on the display. In some examples, the driver selects the user interface element by speaking to the bus system. The bus system can analyze what the driver speaks, e.g., by speech-to-text analysis, and determine that the driver selects the user interface element based on the analysis. The driver can select the user interface element to override the lack of authorization to allow the student to enter or exit the bus.

In response to determining that the bus system receives the input from the driver selecting the user interface element, the bus system adds or removes a name of the student associated with the received student identifier to or from a roster for the bus (516). The roster maintains a list of students associated with the bus, e.g., all the students who enter or exit the bus on a bus route. The driver can review the roster on the display. When an unauthorized student is allowed to ride the bus by the driver overriding the unauthorization, the bus system adds the unauthorized student into the roster. When an unauthorized student exits the bus, the bus system removes the unauthorized student from the roster. In such a way, the bus system keeps an up-to-date roster for the bus.

As noted above, the bus system presents a count on the display for a total number of a list of students on the bus. When the bus system determines that the unauthorized student has entered or exited the bus at the designated stop, the bus system can add or remove the unauthorized student to a list of students on the bus. The presented count can be correspondingly and dynamically increased or decreased.

As a student enters or exits the bus, the bus system may not receive a student identifier from a student identifier system of the student. For example, the student may forget to bring his/her student ID card or does not have a student ID card. The student can tell the driver his/her name. In some cases, the driver can view the displayed list of students to enter or exit at the designated stop and identify whether or not the student name is in the displayed list. The driver can also tap a button to view a list of eligible riders or a roster for the bus route to identify the student.

In some examples, the driver can type or speak the student name into the bus system. The bus system can search the student name in the list of students to enter or exit the bus at the designated stop. If the bus system finds the student name in the list of students, the bus system can present the student name to the driver. The bus system can receive an input from the driver selecting the student and present a photo of the selected student and/or other information associated with the student and a user interface element for manually loading or exiting the student. The driver can compare the student to the presented photo and determine whether or not to override the lack of authorization. If the bus system receives an input from the driver selecting the user interface element to manually load or exit the student, the bus system adds or removes a student identifier associated with the selected student from a roster for the bus without receiving the student identifier from a student ID system of the selected student.

In some cases, if the bus system cannot find the student name in the list of students, the bus system can search the student name in a roster for the bus that is stored in the bus system. If the bus system also cannot find the student name in the roster, the bus system can search the student name in a student accountability system via network connection.

In some cases, if the bus system cannot find the student name in the list of students associated with the designated stop, the roster for the bus, and the student accountability system, e.g., when the student is an anonymous rider, the bus system can store the student name and transmit the student name to the student accountability system for a school administrator or a transportation department staff to deal with. The school administrator or the transportation department staff can add a student profile for the student and assign the activity to the student at a later time. The driver can also get the student name and report it to the transportation department staff or the school administrator after the bus route is completed.

The bus system can present a user interface element, e.g., "anonymous load," for manually boarding the student. The bus system can receive an input from the driver selecting the user interface element and add the student name in the roster for the bus. Correspondingly, the bus system can update on the display a count indicating a total number of students including the student on the bus.

Besides the student name or instead of the student name, the bus system can take a photo of the student, e.g., by a camera in the bus system or an external camera, and use the photo to identify the student, e.g., by face recognition. The bus system can also take a thumbnail image of the student and use the thumbnail image to identify the student.

Figure 5B:
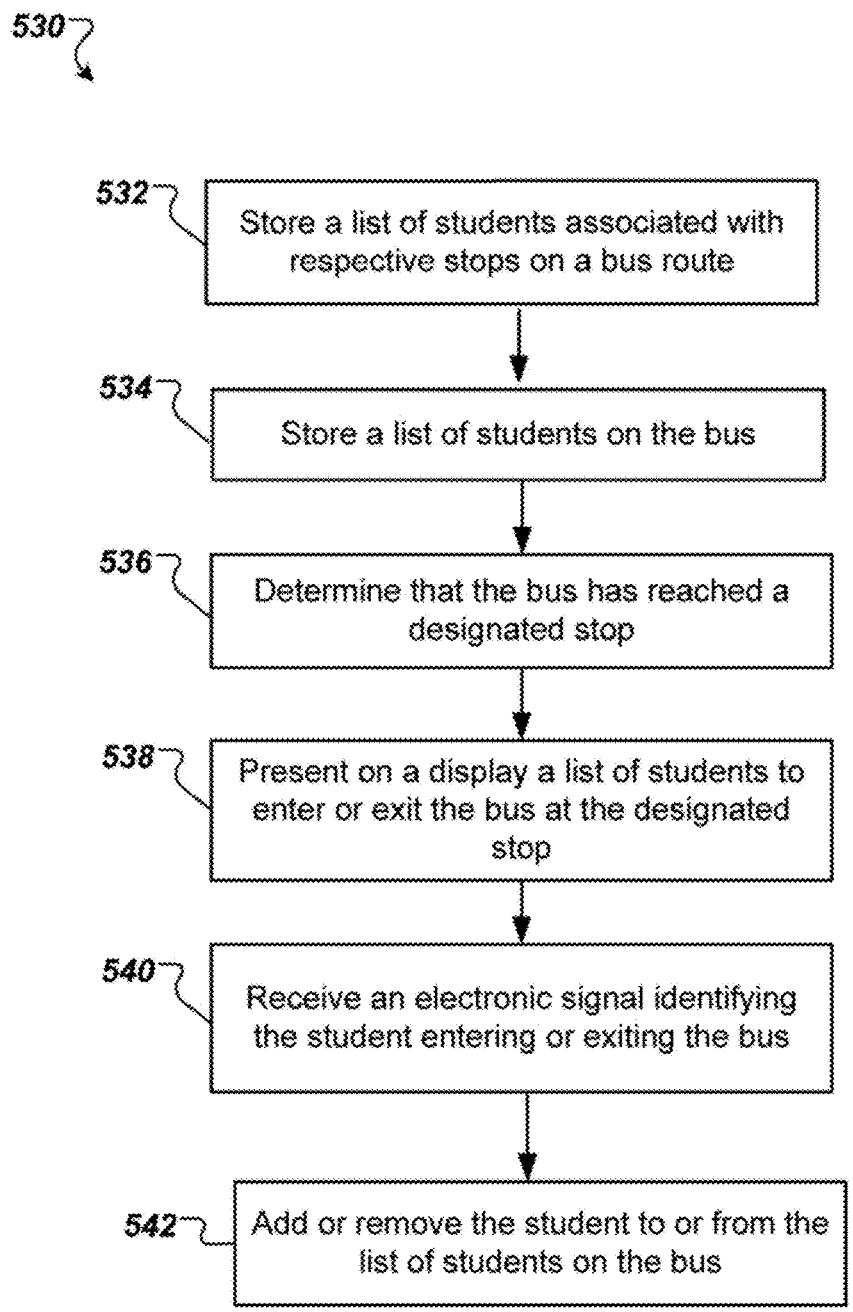
FIG. 5B is a flow diagram of an example process for tracking students on a bus.

FIG. 5B is a flow diagram of an example process 530 for tracking students on a bus. The bus system stores a list of students associated with respective stops on a bus route (532). The bus route can include a number of sequential designated stops. For each designated stop, there may be a list of students that is authorized or eligible to enter or exit the bus. The bus system can store the list of authorized or eligible students associated with the respective stops, e.g., in a repository of the bus system. The bus system can receive and/or update the list of students from a student accountability system, e.g., the student accountability system 102 of FIG. 1.

The bus system stores a list of students on the bus (534). The list of students can enter (or board) the bus at school or at previous designated stops of the bus route. The list of students can include authorized (or eligible) students associated with the bus route or with previous designated stops. The list of students can also include unauthorized students and/or anonymous students that are manually loaded by a driver of the bus. The unauthorized students and/or anonymous students can be temporarily assigned to the last designated stop on the bus route. The bus system can present a count on a display indicating the total number of the list of students on the bus.

The bus system determines that the bus has reached a designated stop (536). As noted above, the bus system can use a locating system, e.g., the locating system 410 of FIG. 4, to monitor a current location of the bus and determine whether a distance between the current location of the bus and the designated stop decreases to within a predetermined range. If the bus system determines that the distance is within a predetermined range, the bus system then determines that the bus has reached the designated stop.

The bus system presents on the display a list of students to enter or exit the bus at the designated stop (538). As discussed above, the bus system can present on the display a list of students associated with the designated stop, including a list of inbound students to enter the bus and/or a list of outbound students to exit the bus. For each of the list of inbound students, the bus system presents a name of the student and/or a photo of the student. The bus system can also present a user interface element, e.g., "LOAD," next to the student name, for manually loading the student. For each of the list of outbound students, the bus system presents a name of the student and/or a photo of the student. The bus system can also present a user interface element, e.g., "UNLOAD," next to the student name, for manually unloading the student. The "UNLOAD" user interface element may be distinguished from the "LOAD" user interface element, e.g., by using different colors.

The list of outbound students to exit the bus at the designated stop can be presented on top of the list of the inbound students to enter the bus at the designated stop. In such a way, student loading/unloading efficiency can be improved. Within the list of outbound students and/or inbound students, the students can be sorted in alphabetic order of their respective names.

In some implementations, the bus system automatically presents the list of students associated with the designated stops on the display, e.g., when the bus system determines that the bus is approaching the designated stop by a locating system such as GPS. Other designated stops can remain collapsed without displaying respective students. In some implementations, the bus system presents a list of sequential stops that remain collapsed on the display, e.g., when the bus system cannot receive a location from the locating system. The bus system can present, for each stop, a user interface element, e.g., "+" or "−", for expanding a list of students or collapsing a list of students associated with the stop. The bus system can receive an input from the driver selecting a particular stop, e.g., by clicking the "+" user interface element for the particular stop, and present a list of students associated with the particular stop on the display.

As each student enters or exits the bus, the bus system receives an electronic signal identifying the student entering or exiting the bus (540). As noted above, the student can present a student identifier system, e.g., the student ID system 112 of FIG. 3A, to an identifier reader that is included in the bus system or externally coupled to the bus system. The student identified system can include a RFID identifier and the identifier reader can include a RFID reader. The bus system can receive the RFID identifier from the identifier reader and identify whether the student is in the list of students associated with the designated stop.

In response to determining that the student is in the list of students, the bus system adds or removes the student to or from the list of students on the bus (542). If the bus system identifies a student exiting the bus at the designated stop, the bus system removes the student from the list of students on the bus. Correspondingly, the bus system decreases the count for the number of students on the bus on the display by one. If the bus system identifies a student entering the bus at the designated stop, the bus system adds the student into the list of students on the bus. Correspondingly, the bus system increases the count for the number of students on the bus on the display by one. In some implementations, the bus system moves a feature associated with the identified student, e.g., a name of the student, to a different position on the display, e.g., a lowered position, or out of the list of students presented on the display.

In some cases, the bus system receives an input from a driver selecting a student. For example, the student forgets to bring his/her student ID system. The driver can find the student in the displayed list of students or in a roster for the bus or in a student accountability system, e.g., by a student name or a photo or a thumbnail image of the student. In response to receiving the input from the driver selecting the student, the bus system can display a student profile of the student, including a photo of the selected student, and a user interface element for manually loading (or boarding) or unloading (or exiting) the student. In response to receiving an input from the driver selecting the user interface element, the bus system can add or remove the student to or from the list of students on the bus.

In some cases, as a student enters the bus, the bus system receives a signal identifying that the student is not associated with the list of students to enter the bus at the designated stop, e.g., the student is associated with a different stop, a different school, or in a suspended state. The bus system can present a manual load user interface element on the display. The driver can then decide whether or not to manually load the student.

In some cases, as an anonymous student enters the bus, the bus system cannot identify the anonymous student in a roster for the bus and/or a student database. The bus system can present an anonymous load feature on the display for the driver to manually load the anonymous student. In response to determining that the driver selects manually loading the anonymous student, the bus system adds the student into the list of students on the bus. Correspondingly, the bus system increases the count for the number of students on the bus on the display by one. The anonymous student can be associated with the designated stop or associated with the last stop on the bus route. When the anonymous student exits the bus, the bus system can present an anonymous unloading user interface element on the display. In response to determining that the driver selects manually unloading the anonymous student, the bus system removes the student from the list of students on the bus. Correspondingly, the bus system decreases the count for the number of students on the bus on the display by one.

In some implementations, the bus system monitors boardings of identified students at each designated stop on the bus route over a predetermined number of route completions. Based on the predetermined number of route completions, e.g., within 30 days or any number of days as determined by a school district, the bus system can automatically determine which students are active riders and which students are inactive riders and alter the list of students associated with the designated stops. When the bus system determines that the bus has reached a designated stop, the bus system can display only a list of active riders associated with the designated stop.

In some implementations, a student accountability system determines a list of active riders and inactive riders. For example, at the beginning of a school year, all eligible riders are considered as active riders. After a period of time, e.g., 30 days or any number of days as determined by a school district, the ridership history is analyzed. Students who have not ridden will no longer be considered as active riders. The student accountability system can update the list of active riders to the bus system. The bus system can still keep a complete list of eligible students including both the active riders and the inactive riders. In some cases, when an inactive rider is boarding the bus at the designated stop at a later time, the bus system may determine that the rider is not in the list of active riders presented on the display but is authorized to board the bus at the designated stop, e.g., in the complete list of eligible students. In response, the bus system can add the rider into the list of active riders.

When a student exits the bus, the bus system can receive an electronic signal from a student ID system associated with the student and determine that the student is authorized to be picked up by one or more release authorization restrictions, e.g., parents and/or guardians. The bus system can display names of the release authorization restrictions and an indication of the release authorization restrictions relationship to the student, e.g., "Mother", "Father", or "Uncle." The bus system can also present a release input user interface element for releasing the student and/or another user interface element for keeping the student on the bus. In some examples, the bus system presents a release input user interface element for each of the release authorization restrictions. In response to determining that the driver selects one of the release authorization restrictions, the bus system can record that the selected release authorization restriction picks up the student with a timestamp.

In some cases, the bus system pre-stores information for the release authorization restrictions including names, photos, and other identifiers. The driver can check the photo to a person that requests to pick up the student and determine whether the person is one of the release authorization restrictions. In some cases, the driver can request the person to present his/her identifier, e.g., a driver license. The driver can determine the person is one of the release authorization restrictions and manually release the student to the person. In some cases, the bus system receives an electronic signal from an identifier system of the person, e.g., a RFID identifier, and determines an identifier of the person from the electronic signal. The bus system can determine that the identifier of the person is associated with one of the release authorization restrictions, and in response, present an authorization indication on the display to indicate that the person is authorized to pick up the student.

The bus system can use a locating system to keep monitoring a current location of the bus. When the bus system determines that the distance between the current location and the designated stop is increasing, the bus system determines that the bus is leaving or pulling away from the designated stop. In some implementations, the bus system determines that the bus is leaving the designated stop by receiving an input from an accelerometer or a door sensor indicating the door is closed. The onboard computing device can include the accelerometer to monitor a door open/closed event. The door sensor, e.g., a door open/close sensor mounted on the door, can be connected to the onboard computing device, e.g., through a wired connection or a short-range wireless connection.

In response to determining that the bus is leaving the designated stop, the bus system can automatically change to a driving mode. The bus system can update on the display a count indicating a total number of the list of students on the bus, e.g., a "on bus" number. The bus system can also automatically determine a next stop subsequent or sequential to the designated stop on the bus route and present a count indicating a total number of a list of students to enter or exit, e.g., a "drop off" (or "unloading") number and/or a "pick up" (or "loading") number. The bus system can also automatically and dynamically present a scheduled or estimated arrival time to the next stop, together with an address of the next stop.

In some cases, if a designated stop is skipped by the driver, e.g., on purpose or by accident, the bus system can automatically skip the designated stop and present information on the next designated stop. The bus system can also provide a user interface element on the display for the driver to skip a designated stop on the bus route.

The bus system can track students in a bus transfer. For example, if an original bus or a driver is unable to complete a route during an emergency event such as breakdown, accident, or illness. The bus system on the bus can execute a bus transfer process. The bus system can maintain a list of identified students on the bus when arriving at a bus transfer location. The bus system can transfer the list of identified students on the bus to a second bus system, e.g., a mobile computing device, on a second bus at the bus transfer location, e.g., via network connection or near-field communication. The second bus system can present on a display the list of identified students.

As each student enters the second bus, the second bus system can receive an electronic signal identifying the student entering the second bus. The second bus system determines whether the identified student is in the list of identified students transferred from the bus system to the second bus system. In response to determining that the identified student is in the list of identified students, the second bus system can present on the display a visual indication or emit an audial indication to indicate that the identified student has successfully entered the second bus. In some implementations, the second bus system compares a list of identified students that have entered the second bus to the transferred list of the identified students. If the second bus system determines that the list of identified students that have entered the second bus is identical to the transferred list of the identified students, the second bus system determines that the bus transfer is completed. If the second bus system determines that the list of identified students that have entered the second bus is not identical to the transferred list of the identified students, the second bus system determines that the bus transfer is not completed and determine which students still have not entered the second bus.

The bus system can also track students in a transfer to a school paraprofessional as discussed above and below. The bus system can transfer a list of identified students to a mobile computing device of the school paraprofessional assigned to the bus. The school paraprofessional can use a paraprofessional application on the mobile computing device to check in the transferred students and/or to release the students to authorized parents/guardians.

Figure 5C:
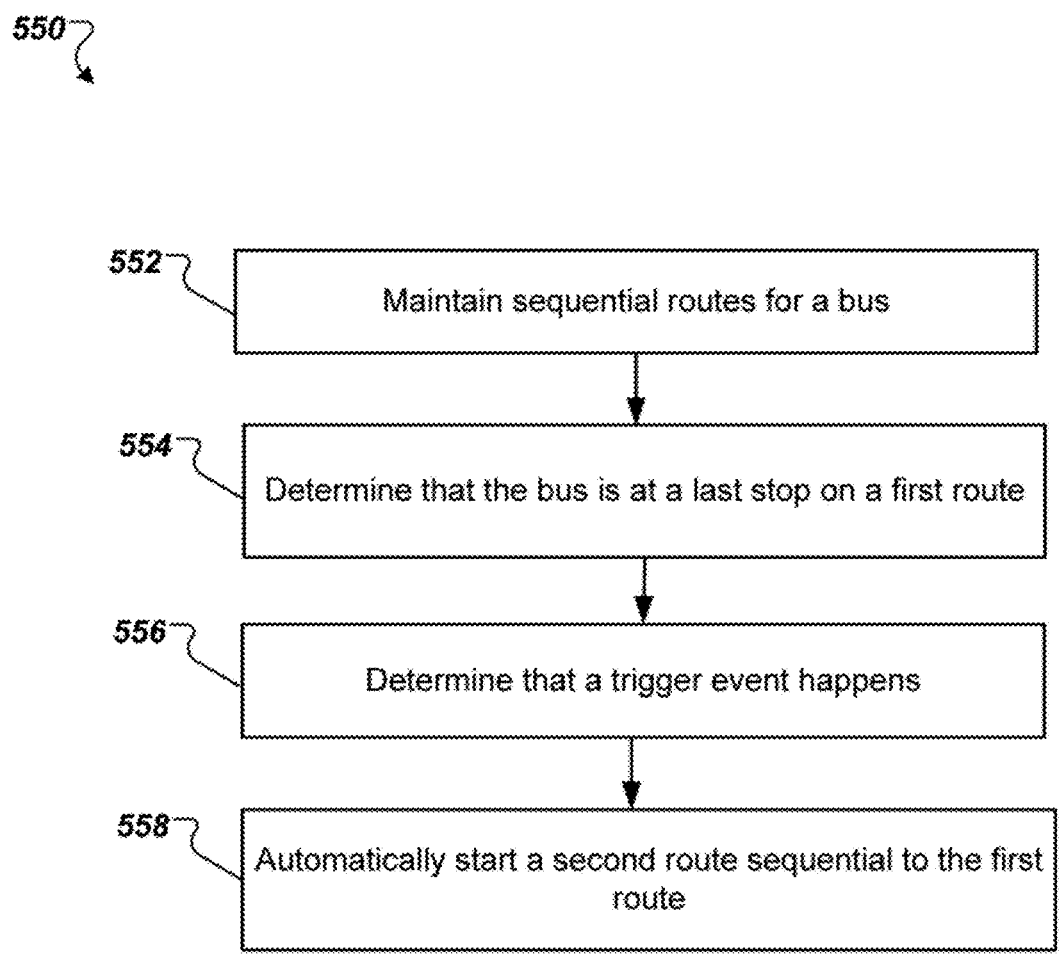
FIG. 5C is a flow diagram of an example process for automatic route transitioning.

FIG. 5C is a flow diagram of an example process 550 for automatic route transitioning. The bus system maintains sequential routes for a bus (552). Each route can include a list of sequential designated stops. The bus system can also store a list of students assigned to each designated stop, e.g., to enter or exit at the designated stop. For example, suppose that the bus covers two routes in a morning, one to an elementary school and one to a middle school. After all of the students have been dropped off at the elementary school, the bus driver starts driving the route for the middle school students.

The bus system determines that the bus is at a last stop on a first route (554). For example, the bus system can use a locating system, e.g., the locating system 410 of FIG. 4, to determine that a current location is at the last stop on the first route. The bus system determines that a trigger event for route transitioning happens (556), and in response to determining that the trigger event happens, the bus system automatically starts a second route sequential to the first route for the bus (558). The bus system can load route data for the second route, including a list of sequential stops and a list of students associated with each of the list of sequential stops. The bus system can present a notification on a display to indicate that the first route is completed and the second route is started.

In some examples, the bus system determines that the bus is pulling away from the last stop, e.g., by using the locating system or by using an accelerometer or a door sensor, which can trigger the route transition to the second route. In some examples, the bus system determines that a number of a list of students on the bus at the last stop is zero. That is, all the students associated with the first route get off the bus. The bus system can then start the second route.

In some examples, the bus system determines that the number of the list of students on the bus at the last stop is larger than zero, e.g., there are still one or more students on the bus. The bus system can perform an alert action to alert the driver that there are still one or more students on the bus. The driver needs to decide whether each of the students on the bus is associated with the first route or with the second route. The bus system can present on the display a list of students on the bus and present, for each of the list of students, a user interface element for manually exiting the student and/or another user interface element for keeping the student on the bus. For example, if the student is associated with the last stop on the first route, the driver can select the user interface element to manually exit the student. If the student is associated with a particular stop on the second route, the driver can select the user interface element to keep the student on the bus. After the driver performs an action for each of the one or more students on the bus, the bus system can prompt a window to a driver. The window includes a user interface element for approving a route transition. In response to receiving an input from the driver selecting the user interface element, the bus system can automatically start the second route.

In some examples, if a student is boarding the bus at the last stop, the bus system receives a student identifier from a student ID system associated with the student and determines that the student is associated with the second route. If the bus system also determines that the student boards the bus at a time within a predetermined time period (e.g., 5 minutes) before a start time of the second route, the bus system can be triggered to automatically start the second route. In some examples, the bus system can also be triggered to automatically start the second route simply by determining that a start time of the second route approaches.

Figure 5D:
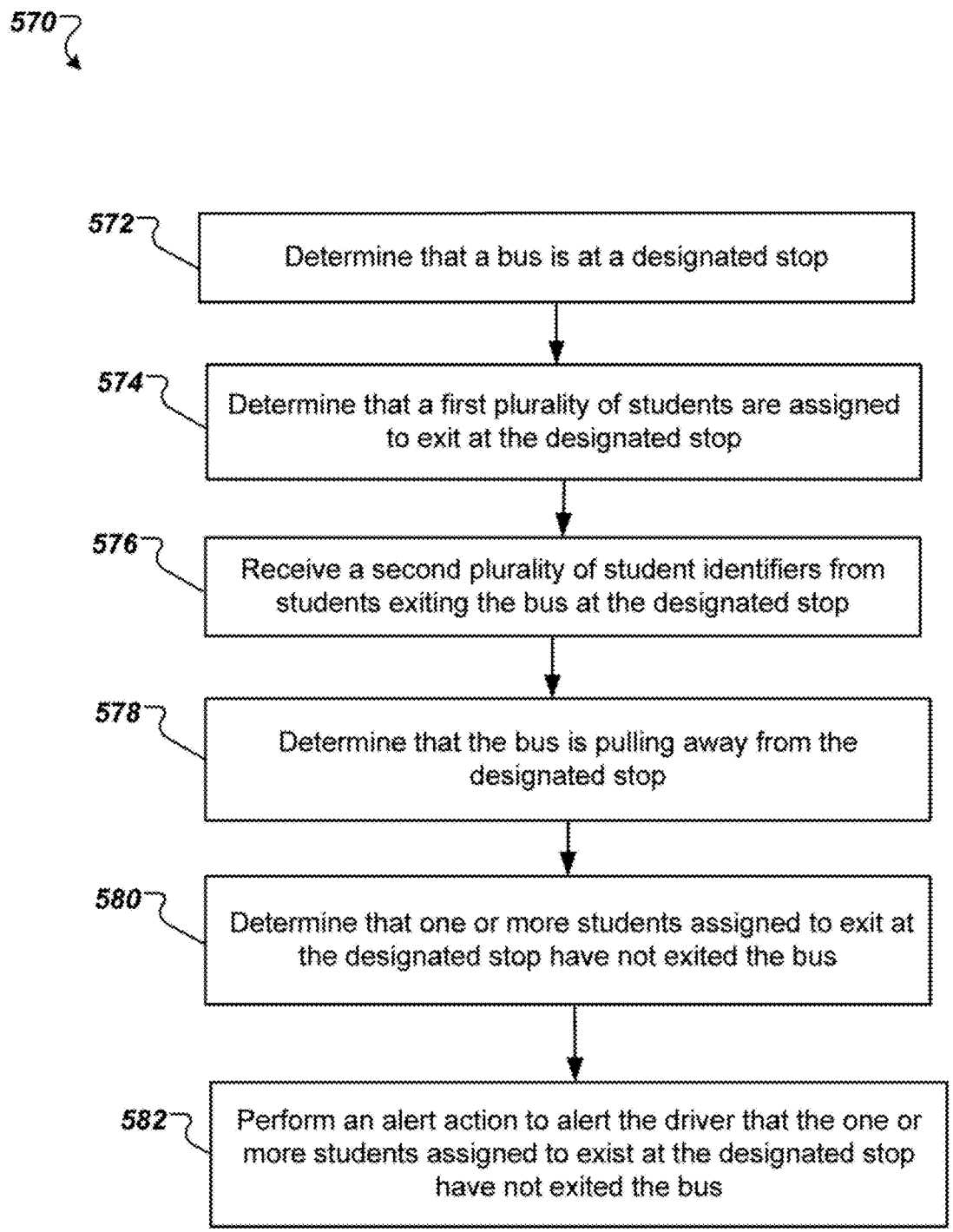
FIG. 5D is a flow diagram of an example process for alerting bus drivers.

FIG. 5D is a flow diagram of an example process 570 for alerting bus drivers. The bus system determines that a bus is at a designated stop (572). The bus system can use a locating system, e.g., the locating system 410 of FIG. 4, to monitor the current location of the bus. The bus system can also use an accelerometer or a door sensor to determine a door open event to determine that the bus is at the designated stop. The bus system determines that a first plurality of students are assigned to exit at the designated stop (574). When each student exits the bus, the bus system receives a student identifier associated with the bus. The bus system receives a second plurality of student identifiers from the students exiting the bus at the designated stop (576).

The bus system determines that the bus is pulling away from the designated stop (578). As noted above, the bus system can determine that the bus is pulling away or leaving the designated stop, e.g., by the locating system and/or by the accelerometer or the door sensor. The bus system determines whether one or more students assigned to exit the designated stop have not exited the bus (580). For example, the bus system can compare the second plurality of students that have exited the bus to the first plurality of students that are assigned to the designated stop. If the second plurality of students are less than the first plurality of students, the bus system can determine that there are one or more students that haven not exited the bus. In some examples, the bus system calculates a difference between the number of the first plurality of students and the number of the second plurality of students and dynamically presents the different on a display.

The bus system performs an alert action to alert the driver that the one or more students assigned to exit at the designated stop have not exited the bus (582). The alert action can include presenting a visual indication on the display, playing an audible indication, emitting a flash light, or activating an alarm system. The bus system can perform one or more alert actions simultaneously to alert the driver.

In some implementations, to prevent students getting left behind on the bus, a barcode or a sticker, e.g., a NFC sticker, is applied at the back of an interior of the bus. Prior to logging off the bus system, the bus system can require the driver to take the bus system to the back of the bus to tag the sticker or scan the barcode. The bus system can then record the event and upload to a student accountability system. In some cases, the driver can use the bus system to record a video during walking to back and front to check seats and floor, ensuring no student left on the bus. The bus system can optionally process the recorded video and upload the recorded or processed video to the student accountability system.

FIGS. 6A-1 to 6R show screen shots of an example GUI for a driver application and illustrate example functions that can be performed by the driver application. The driver application can be the driver application 414 of the bus system 106 of FIGS. 1 and 4.

FIG. 6A-1 is a view of the driver application GUI that can be displayed after a driver logs into the bus system. The driver can log in, e.g., by presenting an RFID driver ID to the ID system 412 of the bus system 106. The GUI displays a picture of the driver, an identifier for the bus and a number of routes that the bus system automatically loads for the driver based on the driver's ID. The bus system can load the routes from the student accountability system. The GUI can also display a button that takes the driver to a pre-trip inspection screen, e.g., that the driver uses while performing an inspection of the bus prior to driving a route. The GUI can also display a button that takes the driver to change bus and/or a button that takes the driver to change routes.

FIG. 6A-2 is a view displayed when the driver selects to change routes. The GUI provides a menu for the driver to select "AM" for routes in the morning and "PM" for routes in the afternoon. The GUI also allows the driver to manually input "BUS ID", a first route, and a second route sequential to the first route. FIG. 6A-3 is a view displayed when a primary driver logs into the bus system, showing his or her usual bus and route information, which can be automatically downloaded, e.g., from a student accountability system.

Figure 6B:
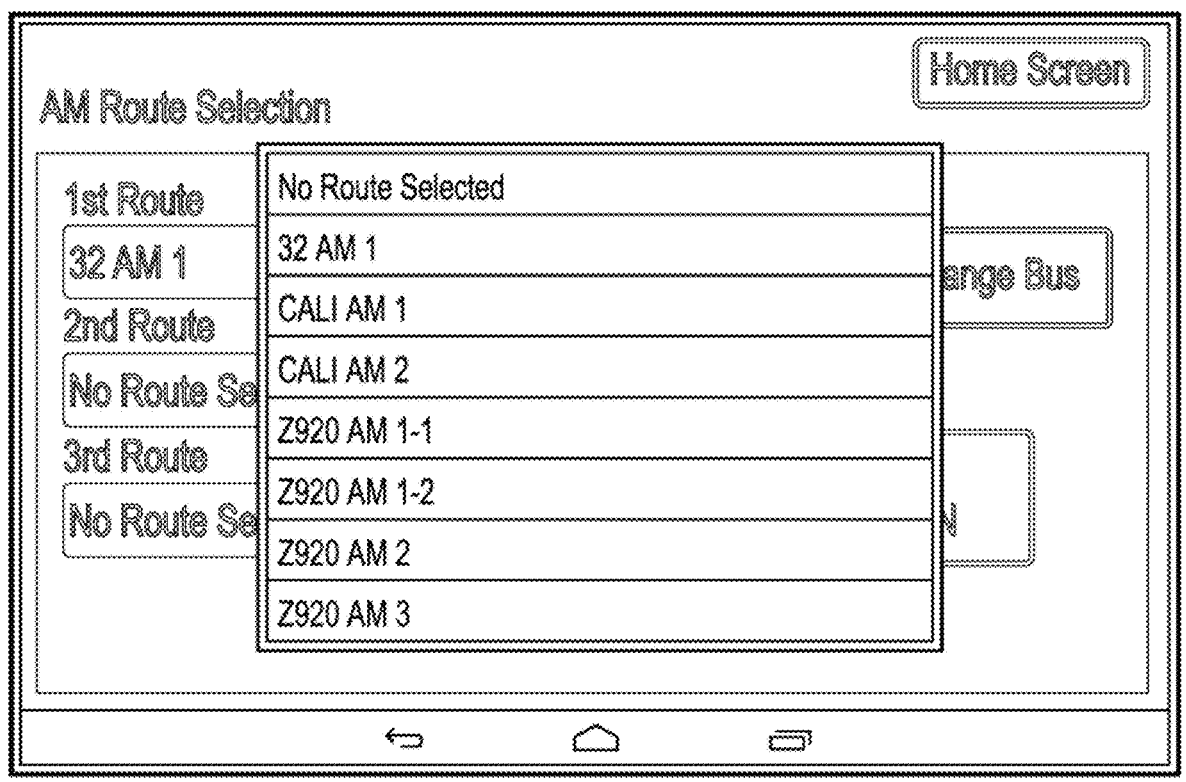

FIG. 6B is a view displayed when a substitute driver logs on to the bus system. Upon recognizing that the driver is a substitute driver, the driver application displays that no route is selected. The substitute driver can select a button to activate a pop-up window that displays a list of routes to choose from.

Figure 6C:
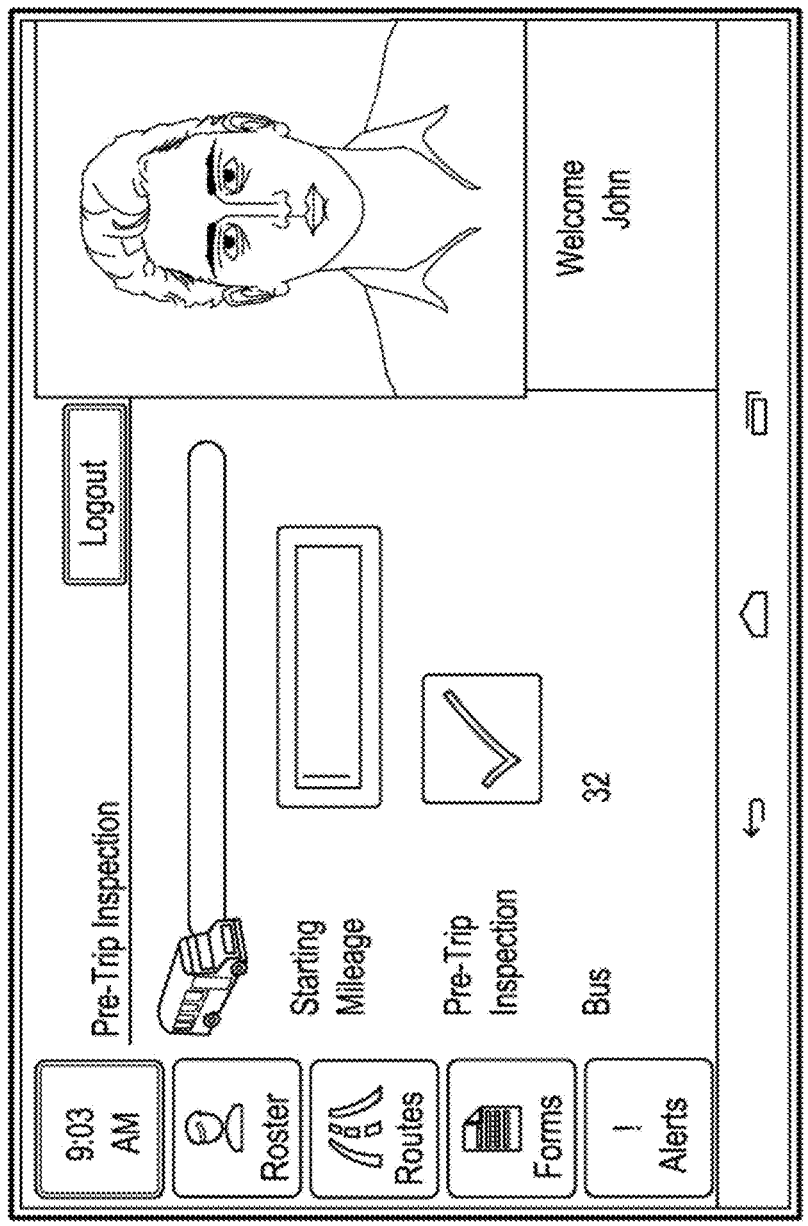

FIG. 6C is a view displayed when a driver selects the pre-trip inspection button of FIG. 6A-1 or FIG. 6A-3. The driver application can prompt the driver to enter certain information, e.g., the starting mileage of the bus and a starting fuel level of the bus. The driver can record or mark conditions of a number of components of the bus during the pre-trip inspection. A maintenance report or request can be automatically generated based on the recorded conditions.

Figures 2, 6D:
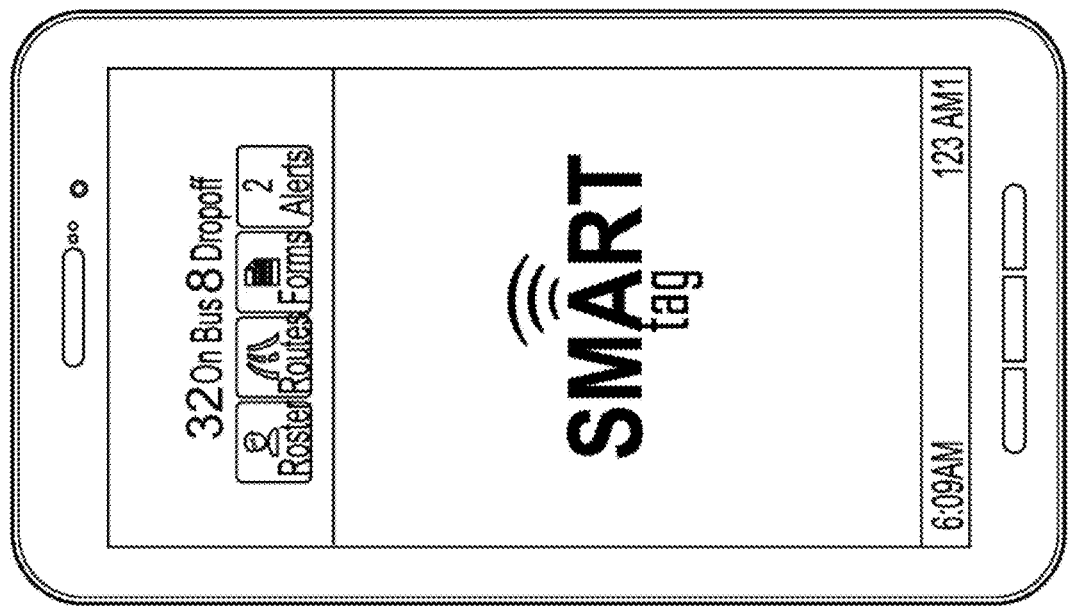
Figures 1, 6D:

FIG. 6D-1 is a view of a home screen for the driver application. The home screen has a navigation bar with various buttons. The screen can also display the current time, which is useful to ensure that drivers are running on the correct time to improve fleet wide efficiency. Another button can display roster information; pressing the roster button enables a driver to view the student roster in different views. The navigation bar can also include buttons to access route data, forms, and alerts that have been sent to the bus system from the student accountability system.

FIG. 6D-2 is another view of a home screen for the driver application. The home screen shows a current bus route, e.g., at the bottom right of the home screen. The home screen also shows a count for a total number of a list of students on the bus and a count for a total number of a list of students to drop off (or exit) at a next stop. In some examples, the home screen can also show a count for a total number of students to enter the bus at the next stop.

Figures 1, 6E:
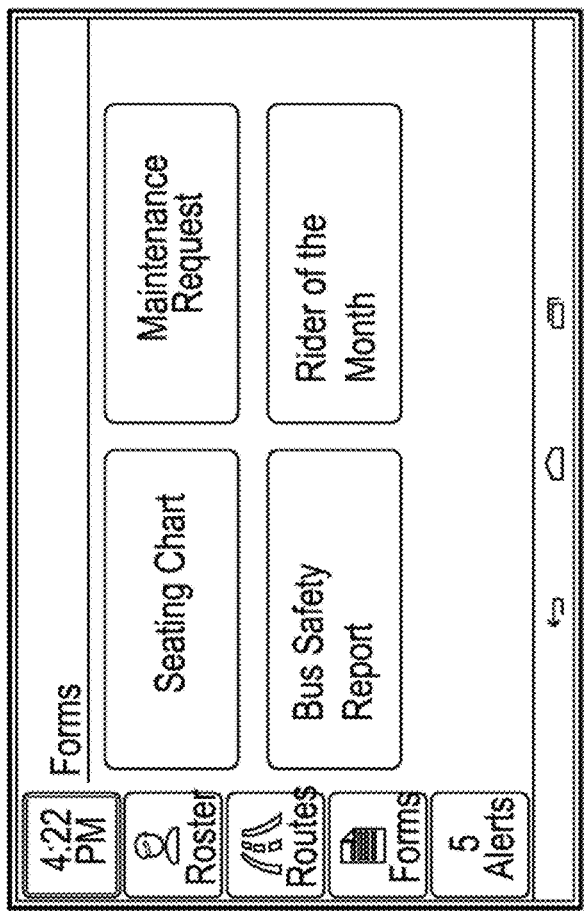
Figures 2, 6E:
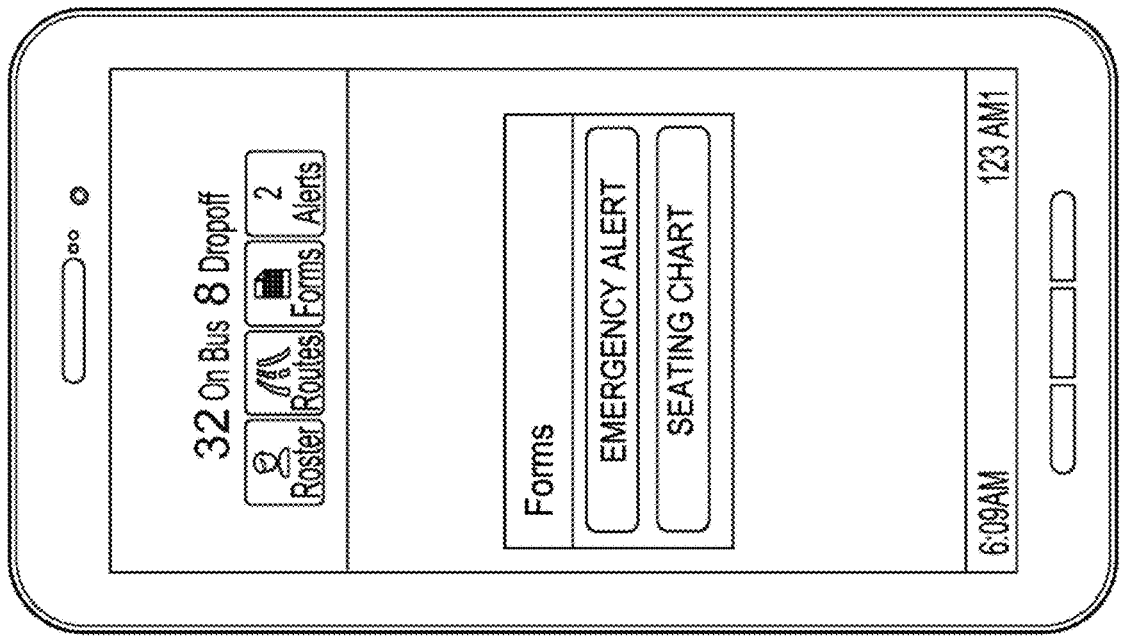

FIG. 6E-1 is a view of the display initiated when the driver selects the "forms" button from the navigation bar. A school system can populate the available forms with customized forms for the school system. For example, the driver can fill out bus safety reports and/or student discipline reports, generate or send maintenance request, review or customize a seating chart, or select a rider of the month for particular commendation.

FIG. 6E-2 is an alternate form display, with a button to allow the driver to review an emergency alert, e.g., from the school system or a transportation system, and/or submit an emergency alert, e.g., to the school system or a police department, such as in the event of vehicle damage, road construction, accidents, or bad weather conditions.

Figures 2, 6F:
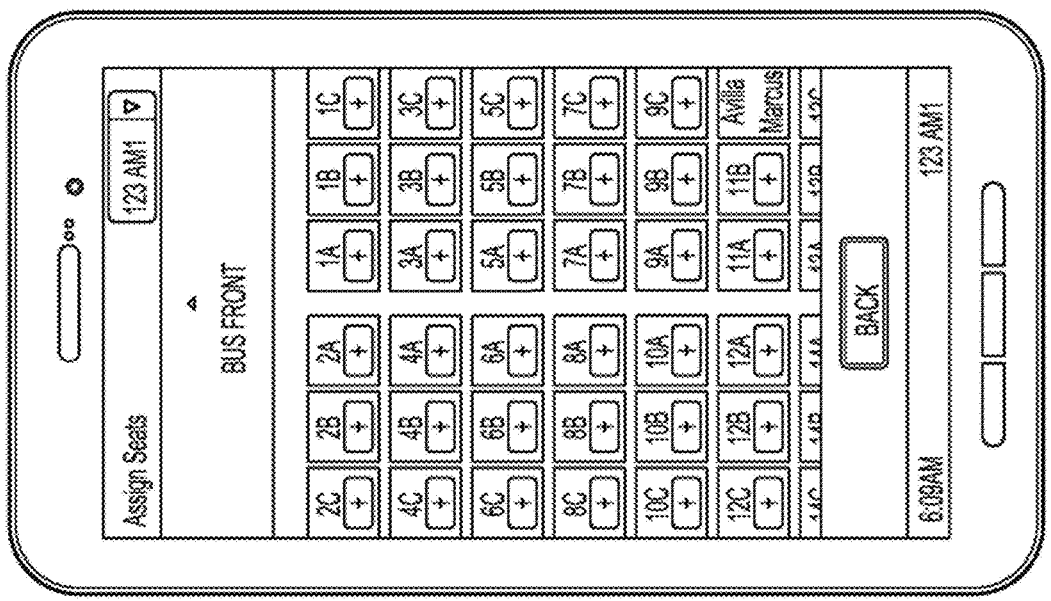
Figures 1, 6F:
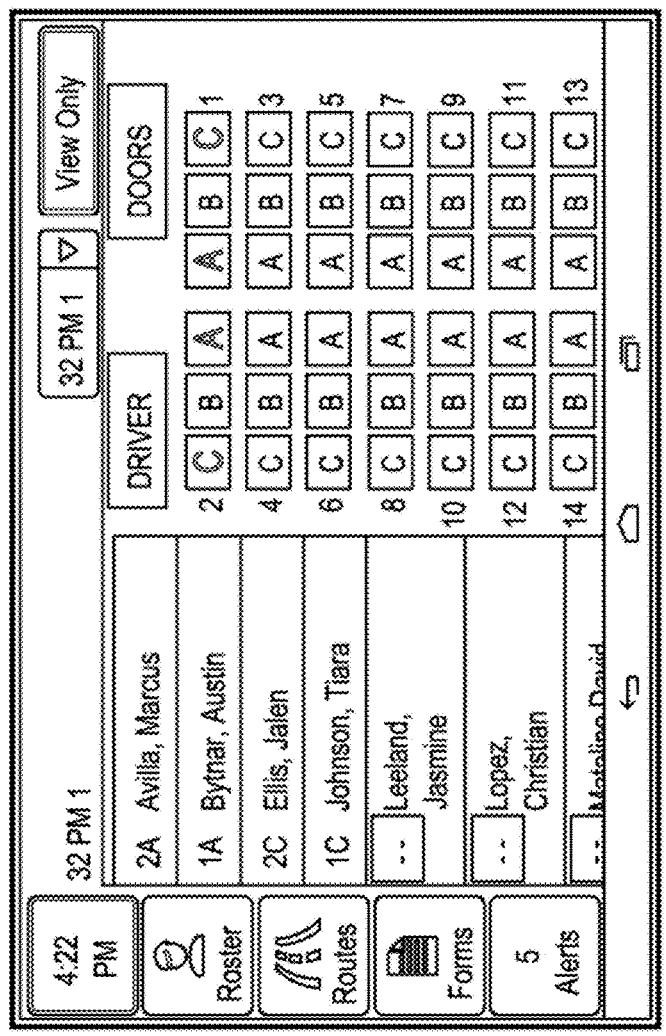

FIG. 6F-1 is a view displayed when the driver selects the "seating chart" button in the displayed "forms," showing a customizable seating chart for a current selected route. The GUI can also present a different seating chart for a different route that the driver selects in the GUI. A default seating chart can be automatically provided by the student accountability system. The driver can assign seats by dragging and dropping names from a list or tapping on a plus sign at each seat to open a window of the student roster and tap on the chosen student to assign the student to a particular seat on the bus. The driver application can then send an updated seating chart to the student accountability system. FIG. 6F-2 is an alternate view displayed when the driver selects the "seating chart" button in the displayed "forms".

Figures 2, 6G:
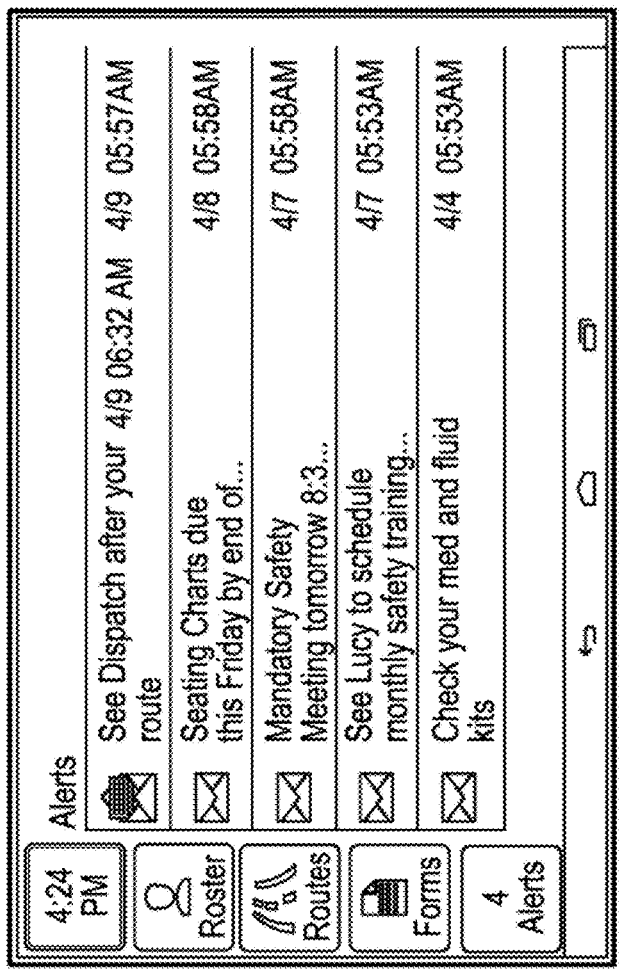
Figures 1, 6G:
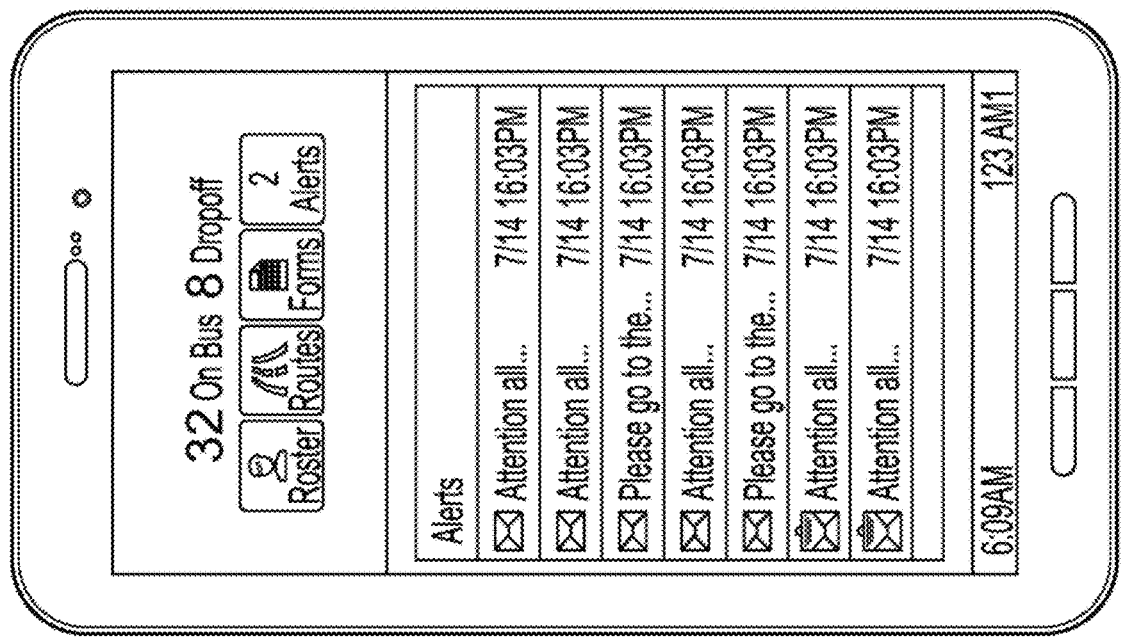

FIG. 6G-1 is a view displayed when the driver selects the "alerts" button from the navigation bar. The student accountability system can send the alerts to the bus system. The alerts can be displayed in a list of messages with indicators showing whether each of the messages have been read. For example, an unread message shows red, while a read message turns into gray. When the driver selects one of the messages from the list, the message is displayed. FIG. 6G-2 is an alternate view displayed when the driver selects the "alerts" button from the navigation bar.

The alerts can include different categories of messages. In some examples, the alerts include messages targeted to a specific driver. In some examples, the alerts include messages targeted to whomever is driving a route or associated with the route (e.g., a school administrator). In some examples, the alerts include messages targeted to whomever is transporting or has relevant cause to see messages related to a student (e.g., a school administrator). The alerts can be configured to be presented to minimize driver confusion and maximize user-friendliness factor, e.g., by sorting and prioritizing and/or visual differentiation through color and/or symbol.

FIG. 6H-1 is a view displayed when the driver selects the "routes" button from the navigation bar. The view displays a list of stops for a current route. The driver application can use a location system, e.g., the location system 410 of FIG. 4, to determine the location of the bus and highlight a current stop on the list corresponding to the bus's location. At a glance, drivers can know what the next stop is and what time they should be there. The GUI can also include a "map" button that presents the list of stops on a map when clicked. FIG. 6H-2 is an alternate view displayed when the driver selects the "routes" button from the navigation bar. A driver can select a particular route to present a list of stops for the selected route in the GUI.

FIG. 6I-1 is a view displayed while students are boarding. From the view, the driver can select one of different types of views. In an "EZ" view, the driver sees a complete list of actual students riding the bus. From an "Alpha" view, the driver sees a complete list of eligible riders in alphabetic order. In some cases, the complete list includes both active riders and inactive riders. In some cases, the complete list can be changed to include ineligible riders such as anonymous riders. The driver can add the ineligible riders by manually loading. From a "Stop" view, which can be a default view, the driver sees a list of riders grouped by their designated stop. The current stop is presented on top of the other stops sequential to the current stop in the bus route. A "load" button can be presented for each of the students to enter the bus and the driver can manually load the student by clicking the "load" button. The GUI also provides a search box for the driver to search a student name or a bus stop.

FIG. 6I-2 is another view displayed when the bus is approaching or has reached a designated stop. The GUI can automatically present or expand a list of students to enter or exit the bus at the designated stop. The GUI presents a count indicating a total number of students to exit the bus at the designated stop, e.g., the number of "drop off" in the GUI. The GUI also presents a count indicating a total number of students on the bus, e.g., the number of "on bus" in the GUI. The total number of students on the bus can dynamically change while students enter or exit the bus. For each of the list of students presented on the GUI, the driver application can present an icon next to the name of the student. The driver can click the icon to view a profile of the student. The icon can be a photo of the student for the driver to identify the student when the student enters or exits the bus.

For each of the students to enter or board the bus, the GUI can present a "load" button for the driver to manually loading the student. For each of the students to exit the bus, the GUI can presents an "unload" button for the driver to manually unload the student. In some implementations, the list of students to board the bus are presented on top of the list of students to exit the bus. In some implementations, the list of students to exit the bus are presented on top of the list of students to board the bus. Within the list of students to board or exit the bus, the names of the students can be sorted in alphabetic order. The GUI also presents a list of sequential stops in collapsed view. The driver can click "+" button besides a particular stop to expand the list of students associated with the particular stop, or click "−" button to collapse the list of students associated with the particular stop.

As noted above, a list of students associated with a designated stop can be provided by the student accountability system. The list of students can include only active riders within a predetermined period of time. The driver application can keep monitoring boardings of identified students at the designated stop over a predetermined number of route completions and then automatically alter the list of students as a function of the monitored boardings following the predetermined number of route completions. In some examples, when a student boards at the designated stop, the driver application can determine that the student is an eligible rider or authorized to board the bus at the designated stop but that the student is not in the altered list of students. The driver application can then add the student to the altered list of students and/or submit the altered list to the student accountability system. In some examples, the student accountability system analyzes the boardings of the identified students and determines which students are active riders and/or which students are inactive riders and alter the list of students associated with the designated stop.

Figures 1, 6J:
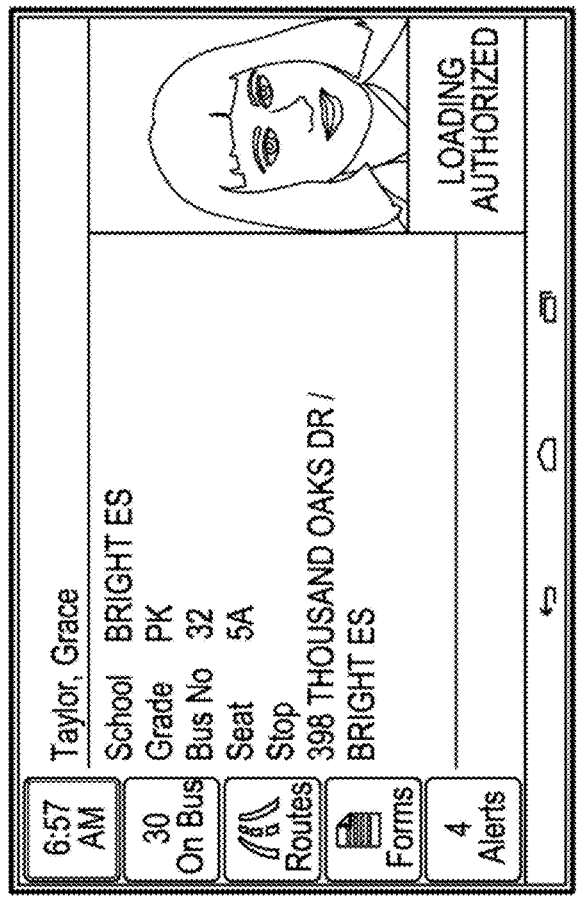
Figures 2, 6J:
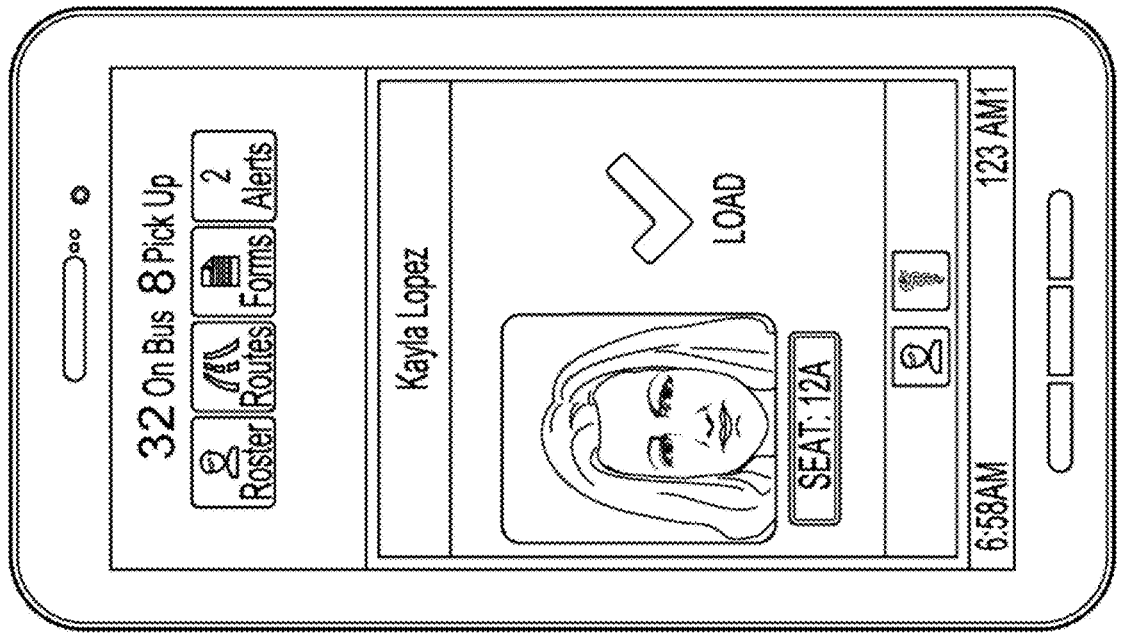
Figures 1, 6L:
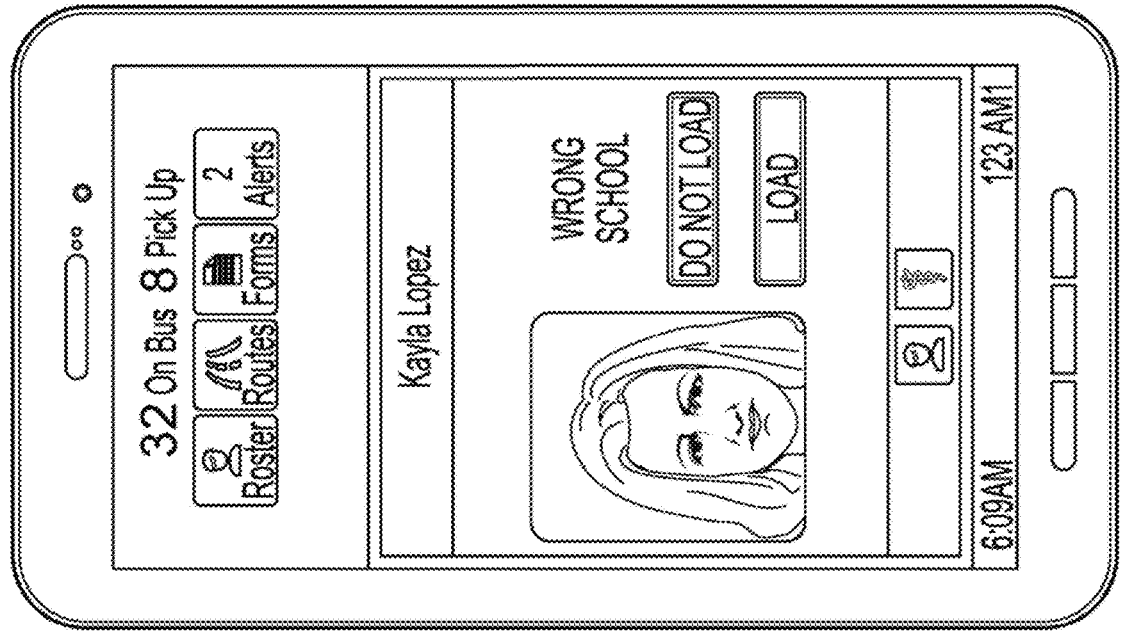

FIG. 6J-1 is a view displayed while students are boarding the bus. As a student presents a student ID system to the bus system, the bus system determines the student's ID and then checks that the student is authorized to ride the current route. The driver application can present visual indication, e.g., a text label "LOADING AUTHORIZED," to indicate that the student is authorized to ride. The driver application can also present the student's name, picture, seat assignment, assigned stop address, and other optional information. Presenting the student's name and picture can help the driver learn the students' names, which can be useful in preventing bad behavior on the bus. Presenting the student's assigned stop address can also help the driver verify that the student is picked up at the right address. The driver application can also present a count of the number of students on the bus that increases as students board the bus, or decreases as students exit the bus.

FIG. 6J-2 is another view of the driver application GUI that can aid drivers in making sure that a student is successfully boarding the bus at the correct stops. The view can show a photo of the student and a seat assignment for the student. The view also shows the number of students on the bus and the number of students to be picked up at the current stop.

Figure 6K:
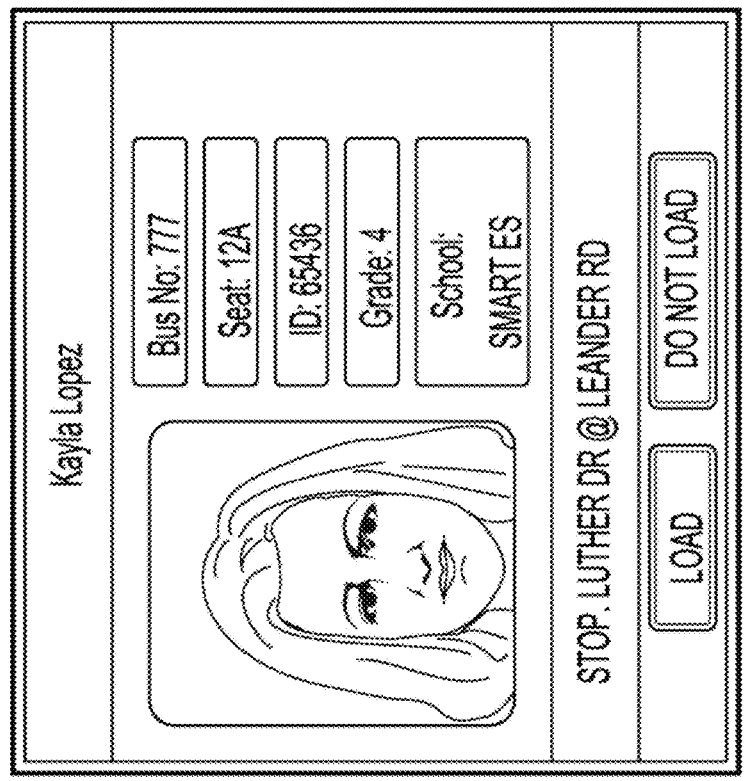
Figures 3, 6L:
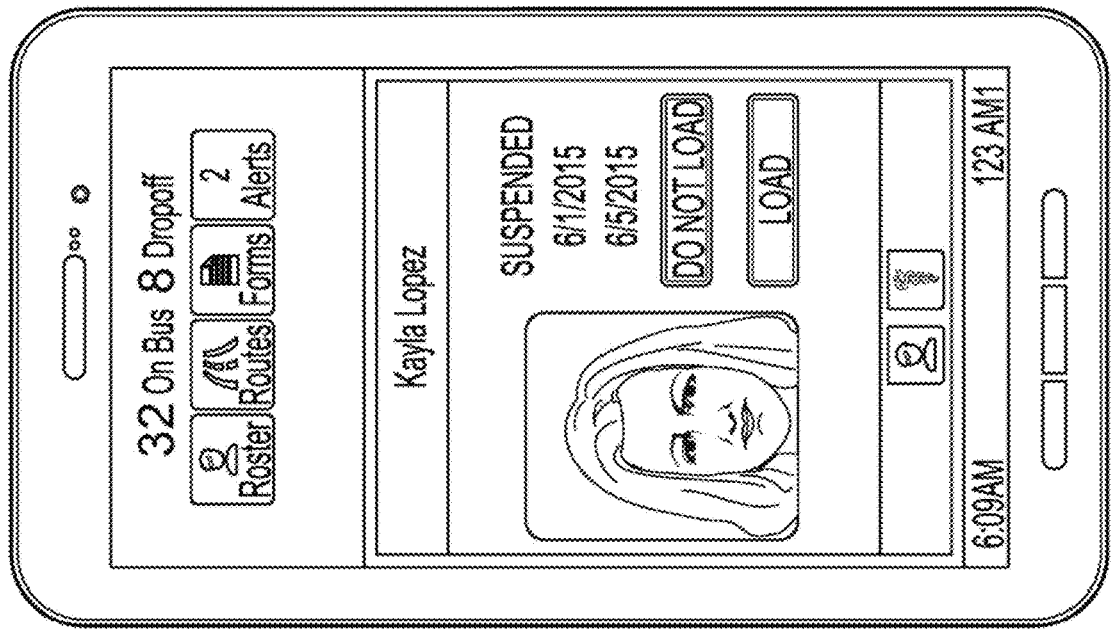
Figures 2, 6L:
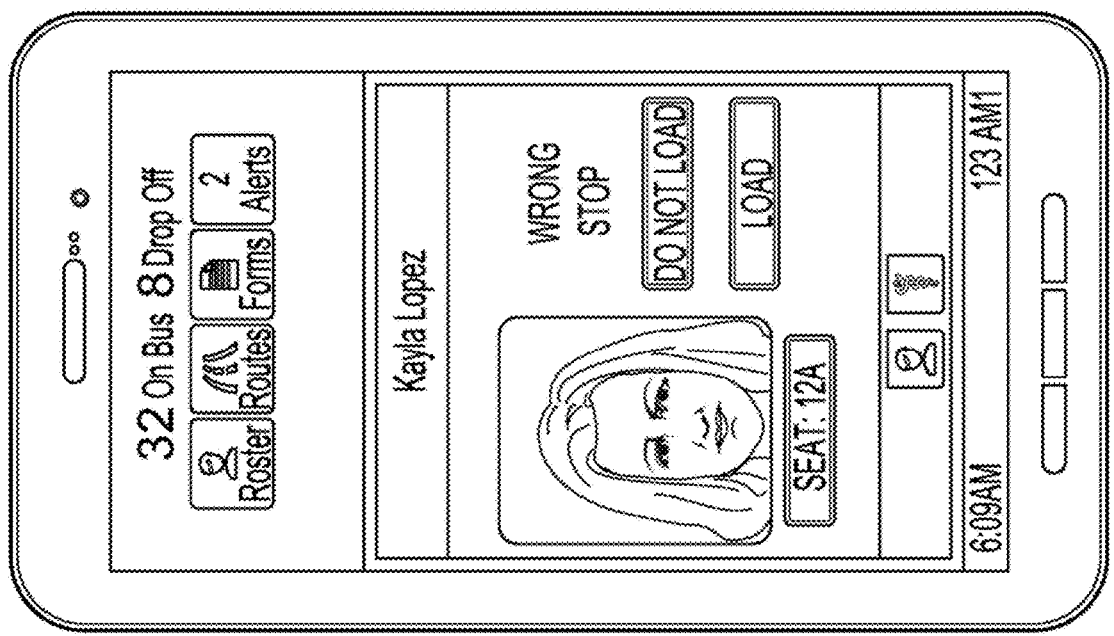
Figures 4, 6L:
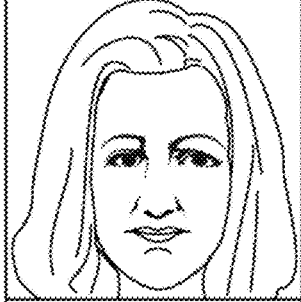

FIG. 6K is a view displayed when the driver application receives an input selecting one of a list of students presented on the display. For example, when a student is boarding the bus without a student ID system, the driver can check whether the student's name is in the list of students to enter the bus at the current stop. The driver can click the student's name to view the student's profile including the student's photo. The view also presents a "LOAD" button and a "DO NOT LOAD" button. The driver can choose whether to manually load the student or not load the student at the current stop. If the driver cannot find the student's name in the list of students presented on the display, the driver can select the "roster" button to see whether the student's name is in the list of eligible students for the route.

FIG. 6L1 to 6L3 are views displayed when an unauthorized student boards the bus. When an unauthorized student boards, the bus system can perform one or more alert actions, including playing an alarm sound and displaying a visual indicator on the screen to show that the student is unauthorized, e.g., presenting a box under the student's photograph that turns red using a red background for the unauthorized student. The view can also present a text label showing a reason for the lack of authorization, e.g., "wrong school," "wrong stop," or "Suspended" with a suspended time period. The driver application can present buttons "LOAD" and "DO NOT LOAD" to allow the driver to manually load the unauthorized student or not load the unauthorized student. When the driver selects the "LOAD" button, the student is added to the roster so that the driver application can account for the student when the students are exiting the bus. FIG. 6L-4 is an alternate view display when an unauthorized student boards the bus. The driver application presents buttons to allow the driver to cancel the boarding, e.g., if the student does not board, or to override the objection and allow the student to board. When the driver selects the override button, the student is added to the roster.

Figure 6M:
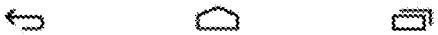

FIG. 6M is a view displayed when the driver selects a student to be manually loaded. The driver application displays the students photograph and a confirmation that the student is authorized. The driver can then confirm that the student should be manually loaded.

Figures 2, 6N:
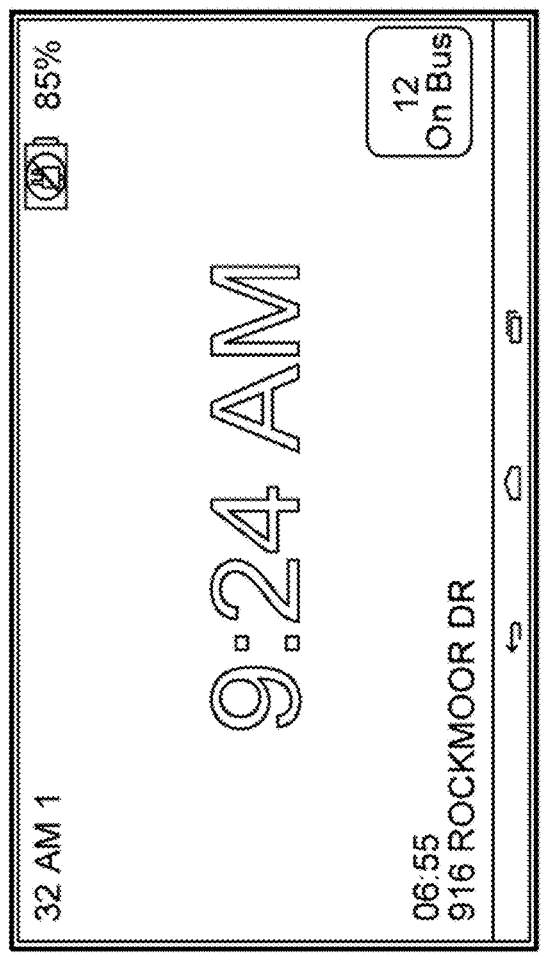
Figures 1, 6N:
Figures 6H-1, 6H-2:
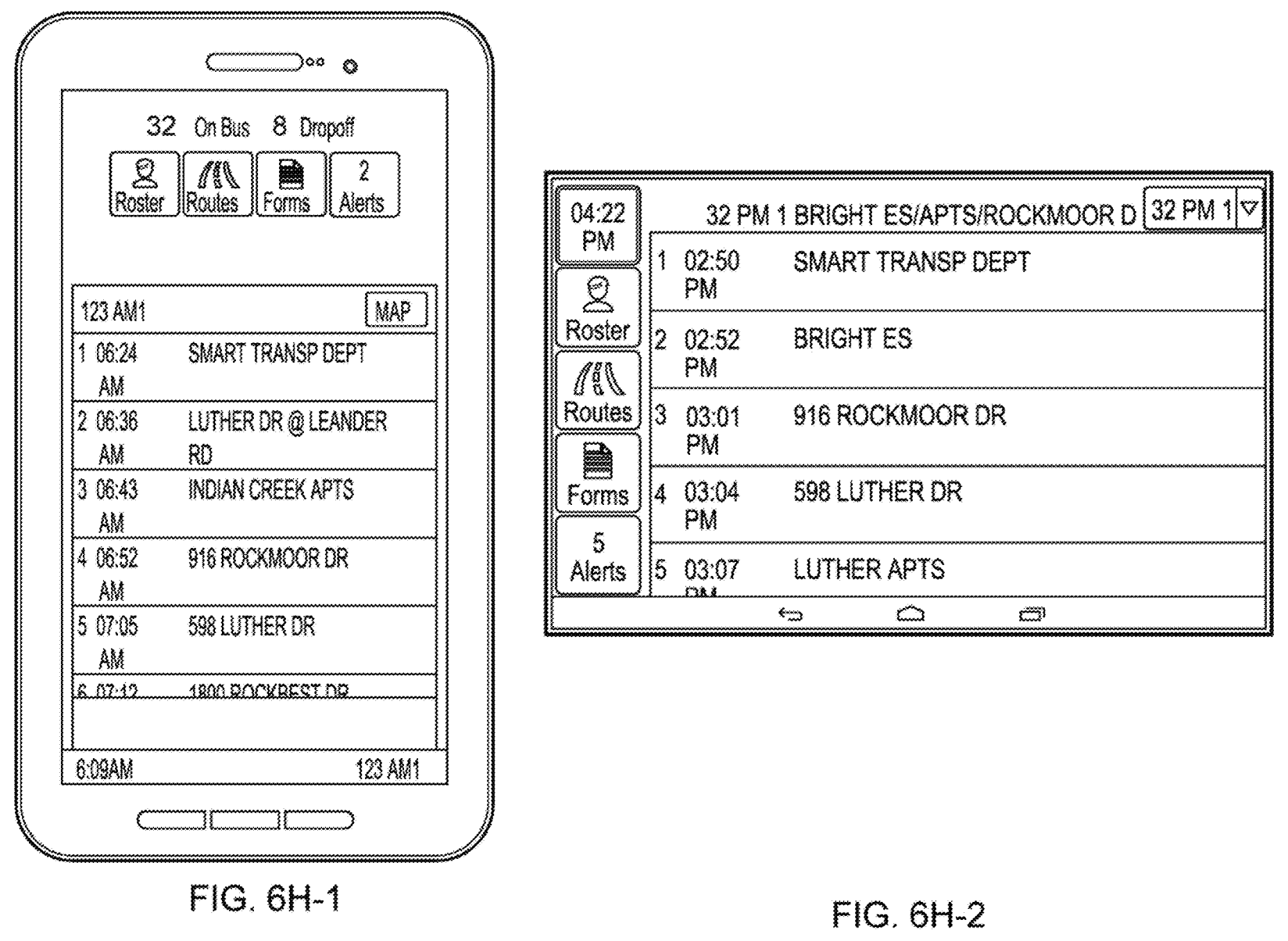
Figures 2, 6O:
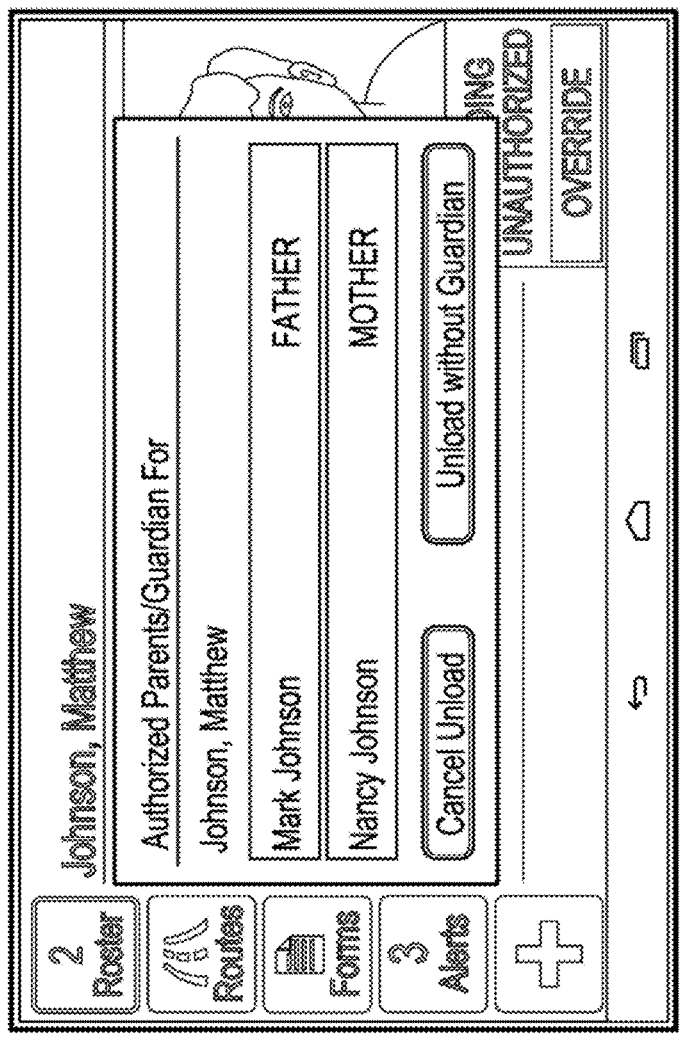
Figures 1, 6O:
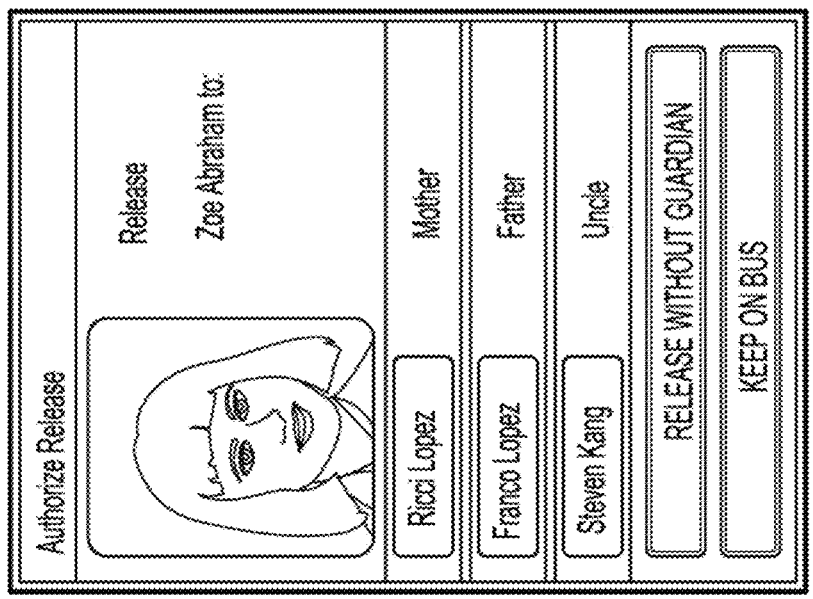

FIG. 6N-1 is a view displayed while the driver is driving the bus. As noted above, the driver application can determine that the bus is pulling away from a designated stop and towards a next designated stop and automatically present information of the next stop such as an address and a scheduled or estimated arrival time. The view also shows a current bus route, a current time, a count for a total number of students on the bus, and a count for a total number of students to be picked up or dropped off at the next stop. Keeping the drive mode view uncluttered can prevent the driver application from distracting the driver. FIG. 6N-2 is another alternate view displayed while the driver is driving the bus. In this "drive mode," the driver application can also display the route and battery life.

FIG. 6O-1 is a view displayed when a student is exiting the bus and the student is required to be released to a parent or guardian. When such a student presents a student ID system to the bus system, the driver application presents a list of authorized parents or guardians and optionally can also play an audio prompt to help draw the driver's attention. The driver can select one of the authorized persons from the list to release, cancel the unloading to keep the student on bus, or release the student without a guardian. The driver application records which parent or guardian picks up the student and record the event to report to the student accountability system. FIG. 6O-2 is an alternate view displayed when a student is exiting the bus and the student is required to be released to a parent or guardian.

Figures 6P-1, 6P-2:
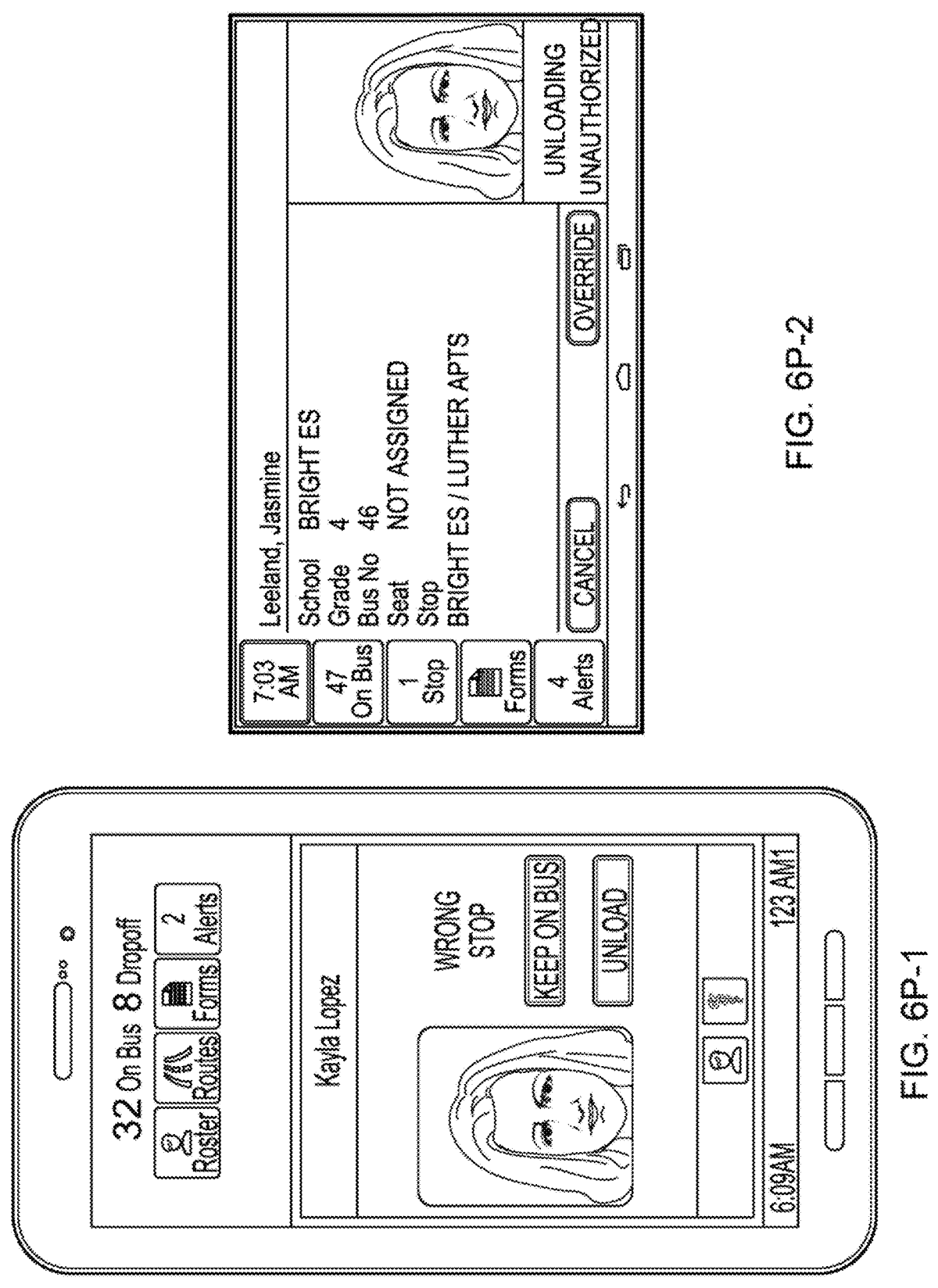

FIG. 6P-1 is a view displayed when an unauthorized student is exiting the bus at the current stop. The driver application informs drivers when students attempt to get off at a stop that is not their designated stop. This can be useful, e.g., when a younger elementary student mistakenly tries to get off at the wrong stop. The driver application can present buttons for the driver to keep the student on bus or manually unload the student at the current stop.

FIG. 6P-2 is an alternate view displayed when an unauthorized student is exiting the bus at the current stop. For example, the unauthorized student can be associated with another route and not assigned seat at the current route. The driver application can present buttons for the driver to cancel the unloading to keep the student on bus or to override the objection and allow the student to unload at the current stop. When the driver selects the override button, the student is removed from the roster so that the driver application can update the number of students on the bus.

FIG. 6Q is a view displayed when the driver application determines that the driver finishes one or more bus routes in a session. The driver application can prompt the driver to enter certain information, e.g., the ending mileage of the bus, and indicate the driver the fuel level. FIG. 6R is a view displayed when a driver selects the post-trip inspection button or when the driver application prompts the driver to perform the post-trip inspection. When the post-trip inspection is performed, the driver application can verify the completion.

FIGS. 7A to 7F show screen shots of an example GUI for a paraprofessional application and illustrate example functions that can be performed by the paraprofessional application. The paraprofessional application can be executed on a computing device, e.g., the user device 130 of FIG. 1, by a school paraprofessional, e.g., the school paraprofessional 128 of FIG. 1. Preferably, the paraprofessional application is resident and running on a mobile computing device such as a tablet computer or smartphone that the paraprofessional carries with him or her. For example, the paraprofessional can be assigned to meet busses of students at a bus transfer facility, and be responsible for assuming temporary physical custody of the students and ensuring that they are safely transferred from one bus to another. In such assignments the paraprofessional application can communicate with the driver application upon bus arrival, either directly through local wireless communication or through a remote server, to transfer an onboard rider roster.

Figure 7B:
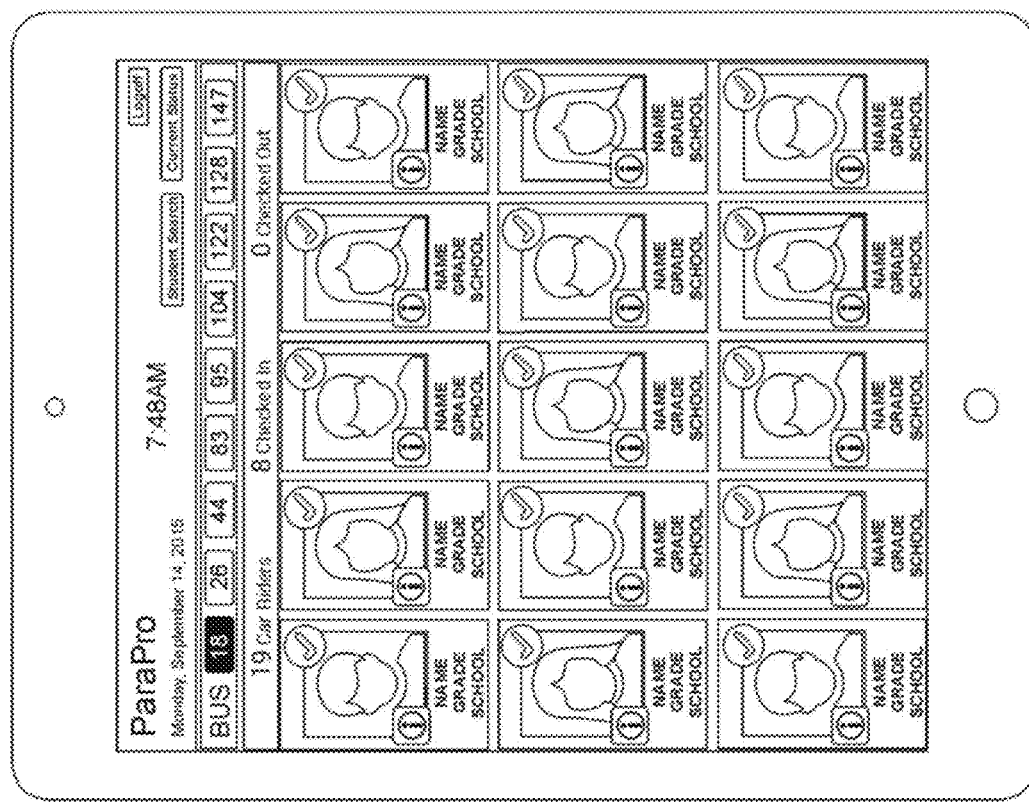
Figure 7A:
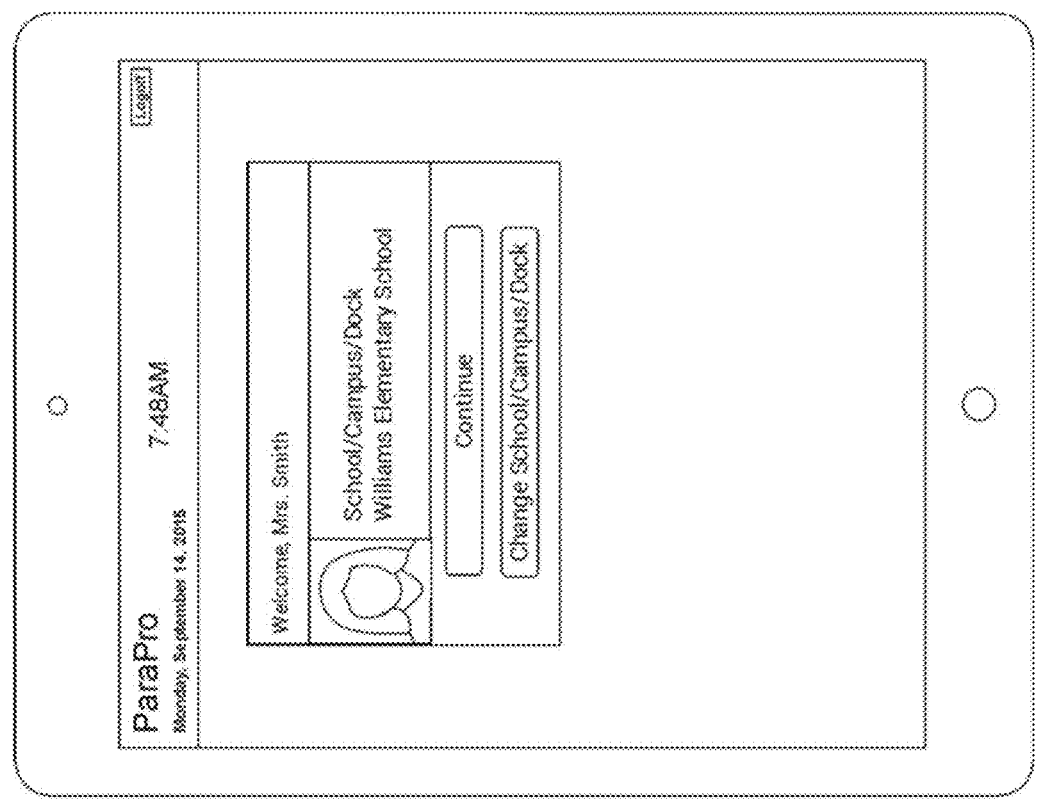

FIG. 7A is a review displayed after the school paraprofessional logs on the paraprofessional application on the computing device and/or on a student accountability system, e.g., the student accountability system 102 of FIG. 1, through a paraprofessional portal. The GUI can present a photo of the school paraprofessional and assigned School/Campus/Dock, which can be stored in the computing device and/or the student accountability system. The school paraprofessional can log on with a secure user name and password and/or with other secure mechanisms such as biometric identifiers. The school paraprofessional can also use the paraprofessional application to log on the student accountability system.

After logging on the student accountability system, the paraprofessional application can automatically download up-to-date information associated with the paraprofessional. The up-to-date information can include a list of buses associated with the paraprofessional and scheduled to arrive at a transfer location (e.g., a school) and a list of rosters for each bus. A roster can include all the eligible student riders (include active riders and inactive riders). The information can also include a list of students on the bus. As noted above, the paraprofessional application can also receive information of the buses and associated rosters or lists of students on the buses from a bus system, e.g., the bus system of 106 of FIGS. 1 and 4. For example, if there is no internet or wireless connection, the computing device and the bus system can communication via near-field communication (NFC) technology. The information can also include student discipline reports or school activity reports.

If the displayed school/campus/dock is not the assigned school/campus/dock, e.g., when a substitute paraprofessional logs in the application, the school paraprofessional can select to change the school/campus/dock. If the school paraprofessional confirms that the displayed school/campus/dock is the assigned school/campus/dock, the school paraprofessional can tap "Continue" button on the display to continue.

FIG. 7B is a view displayed after the school paraprofessional selects the "Continue" button. The view displays a list of buses associated with the paraprofessional, which are displayed as a horizontal list in a bus navigation bar. The paraprofessional can tap on any of the Bus buttons to toggle between rosters.

In some implementations, the paraprofessional application automatically arranges relative positions of the buses based on their arrival time. For example, the first arrival bus can be listed as the first bus listed in order. Accordingly, the paraprofessional application can display a list of students on the bus or a roster of students for the bus. The list of students can be displayed in an alphabetic order. Students that exit at the transfer location can be displayed in front of other students that stay on the bus at the transfer location. Active student riders in the roster can be displayed in front of inactive riders or unauthorized student riders such as anonymous riders. For each student, a photo, name, grade, and a school assigned to the bus can be presented on the display. The paraprofessional application also presents a number of student riders on the bus, as well as a number of students that have been checked in and a number of students that have been checked out, e.g., to be released to parents/guardians or to another bus or to a school.

Figures 7C, 7D:
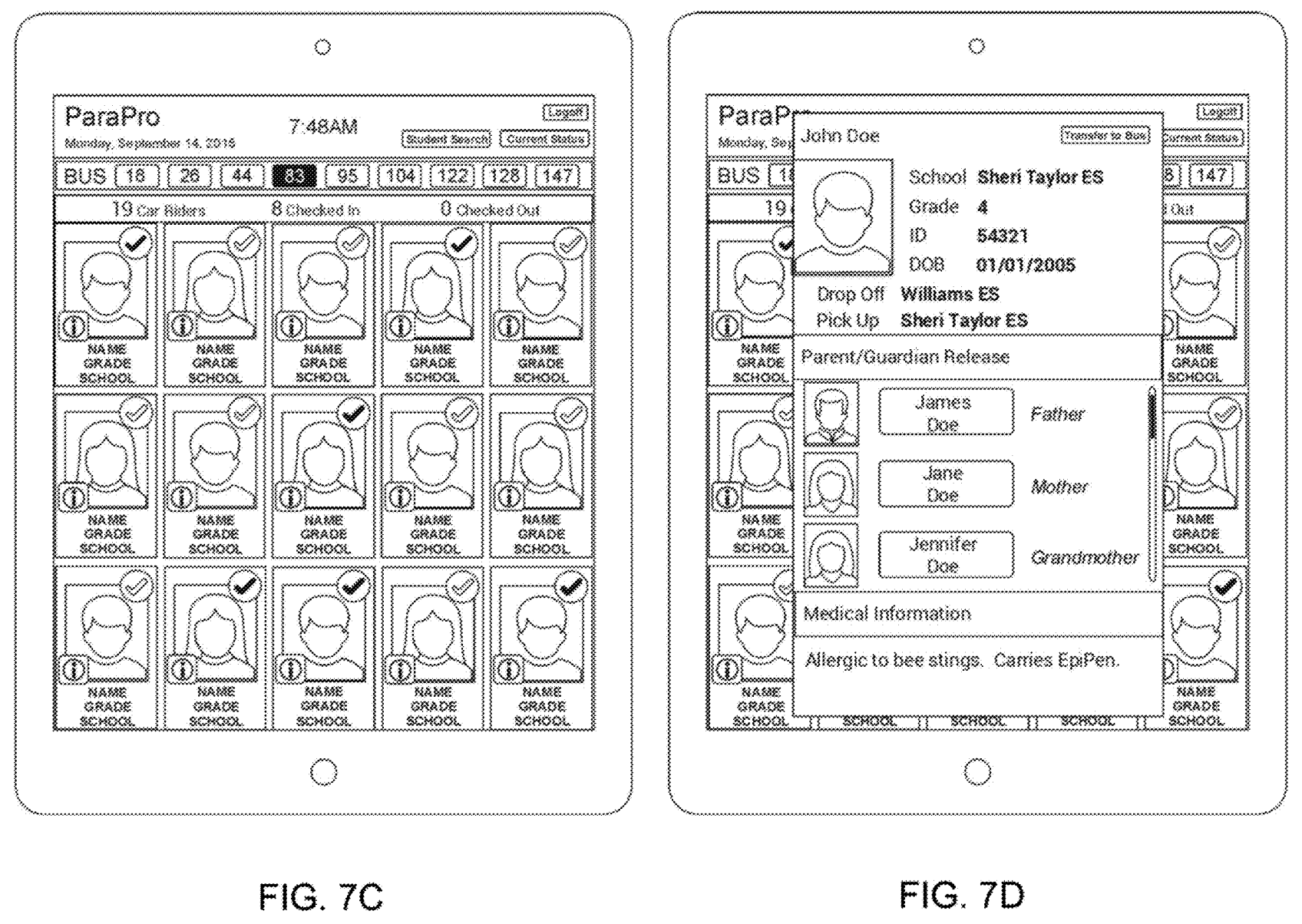

The school paraprofessional can also select a bus, e.g., by tapping on the bus in the bus navigation bar, when the bus is approaching the transfer location. FIG. 7C is a view displayed showing a roster of students for the selected bus. The roster can include a list of eligible students for the bus including active riders and inactive riders, as well as unauthorized riders or anonymous rider on the bus. In some examples, the paraprofessional application determines which students are currently on the bus and which students are not currently on the bus and sorts the students on the bus on the top of the roster, e.g., in an alphabetical order represented by a gray checkmark "√" in a circle at the top right of the student photo, and the other students that are not on the bus to the bottom of the roster, e.g., in alphabetical order represented by a gray "X" in a circle at the top right of the student photo. In some examples, within the list of students that are currently on the bus, the paraprofessional application sort the students that exit at the current transfer location on top of the students that remain on the bus at the current transfer location. In some examples, the paraprofessional application presents only the list of students that are currently on the bus on the display.

The computing device of the paraprofessional can include an identifier reader such as a RFID reader or a barcode reader. As each student exits the bus, the student can check in with the paraprofessional by presenting the student identifier, e.g., the RFID identifier, with the computing device. The identifier reader can identify the student identifier and the paraprofessional application can determine whether the student identifier is in the list of students on the computing device. If the student identifier is determined to be within the list of students on the computing device, the paraprofessional application provides a visual indication, e.g., the checkmark turning white and/or the circle turning green to visually confirm the student has been checked in, and/or play an audial indication, and/or emit a flashing light. The paraprofessional can also manually check in the student, e.g., by tapping on the circle with the checkmark of the student. After confirming that the student has been checked in, the paraprofessional application can update the number of students that have been checked in, e.g., below the Bus navigation bar.

If the paraprofessional cannot identify a student, the paraprofessional can perform a student search, e.g., in a roster for the bus or in a student accountability system. If the paraprofessional needs more information regarding a student in the list of students displayed on the display, the paraprofessional can select the student, e.g., by tapping on an icon for the student such as an information button located at the lower left of the student's photo.

FIG. 7D is a pop-up window that appears displaying the student's profile. The profile can include the student's name, photo, school, grade, student ID, date of birth, pick up and drop off locations, and a list of authorized parents/guardians the student can be released to. The profile can also include photos of the list of authorized Parent/Guardian photos and names. The profile can include the student's medical information if applicable.

When a parent or guardian is picking up the student, the paraprofessional can select the student to view the student's profile to verify the parent or guardian. In some examples, the parent or guardian can present an identifier, e.g., a RFID identifier for the parent or guardian, to the computing device of the paraprofessional, and the paraprofessional application can verify the identifier of the parent or guardian and notify the paraprofessional by a visual indication, an audible indication, and/or a light indication.

After the paraprofessional verifies the parent or guardian picking up the student, the paraprofessional can select the parent or guardian by tapping on the appropriate Parent/Guardian name button releasing the student. In response to determining that the paraprofessional has selected the parent or guardian, the paraprofessional application can record the date, time, location, and who the student has been released to. After confirming that the student has been released or checked out, the paraprofessional application can update the number of students that have been checked out, e.g., below the Bus navigation bar.

Figures 7E, 7F:
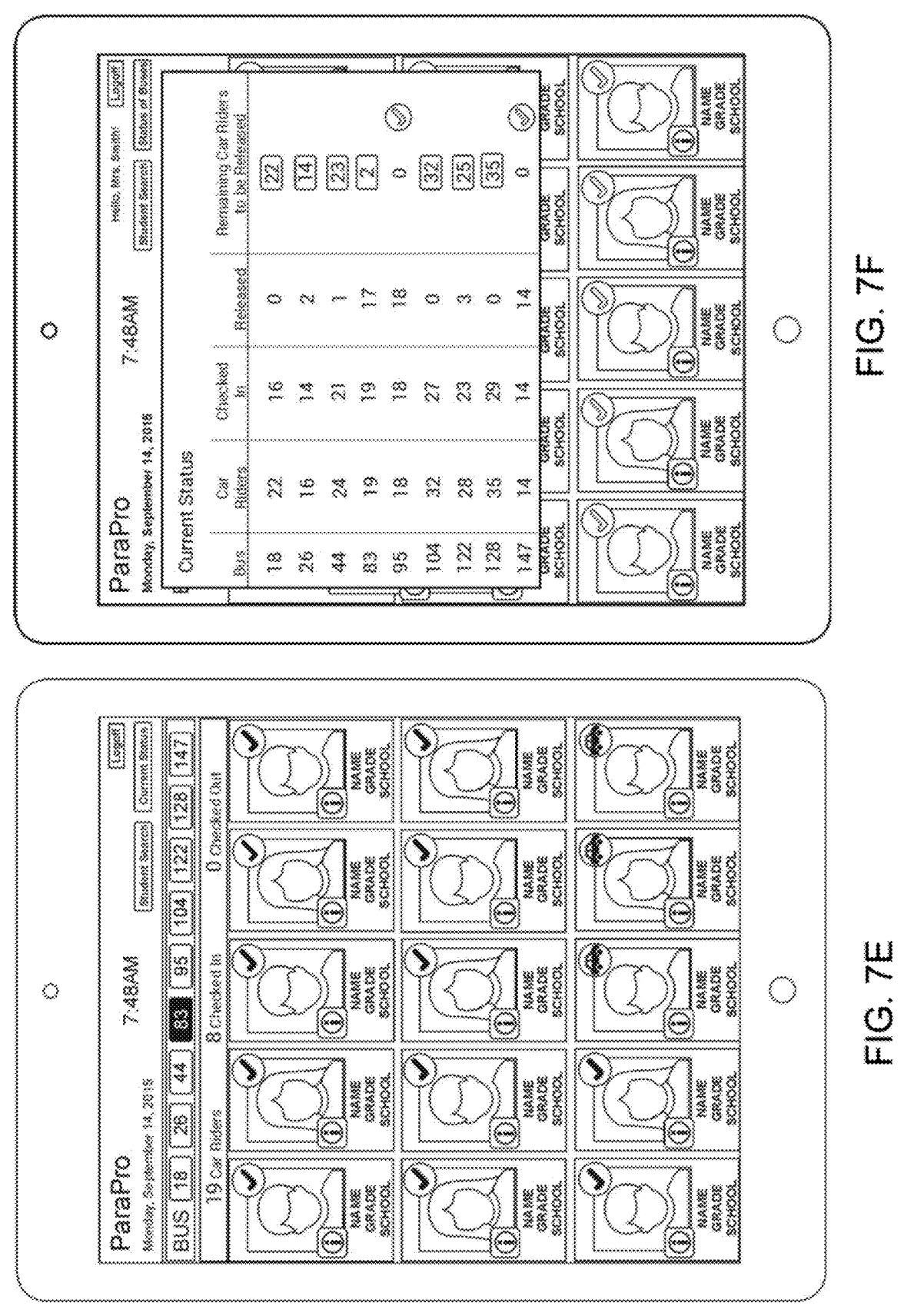

After the student has been released or checked out, the paraprofessional application can sort the roster by moving the released students to the end of the list of checked in students as illustrated in FIG. 7E. The application can also give a visual indication to confirm that the student has been released, for example, by changing the background color of the student (e.g., from green to blue), changing the circle with the checkmark from green to blue, and replacing the white checkmark with a white car icon that visually confirms that the student has been picked up by an authorized parent/guardian to ride in a car.

The paraprofessional can also view a current status of the student riders from the list of students assigned to the paraprofessional, e.g., by clicking "Current Status" button at the upper right of the display. FIG. 7F is a view, e.g., a pop-up window, displayed when the paraprofessional selects to view the current status of the buses. The view includes all the buses at the current transfer location, the number of student riders that are on each bus, the number of student riders that have been checked in, the number of student riders that have been released or checked out, and the remaining student riders to be released from each bus. The paraprofessional can click a button for the remaining student riders to view which students still need to be released. Then the application can pop up a window showing all the names of the student riders that have not yet been released. When all the student riders from a particular bus have checked in and have been released, the number of the remaining student riders to be released column can show a label "0" and a green circle with a white checkmark can be next to the label "0" to visually confirm all student riders from that bus have been released.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, the subject matter is described in context of scientific papers. The subject matter can apply to other indexed work that adds depth aspect to a search. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

While a number of examples have been described for illustration purposes, the foregoing description is not intended to limit the scope of the invention, which is defined by the scope of the appended claims. There are and will be other examples and modifications within the scope of the following claims.

What is claimed is:

1. A method of tracking students on a bus, the method comprising:
storing, in an onboard computing device, a first list of students associated with a list of respective stops on a bus route;

storing, in the onboard computing device, a second list of students including all students on the bus by recording students entering or exiting the bus at the list of respective stops on the bus route;
determining that the bus has reached a designated stop;
presenting on a display a list of students of the first list associated with the designated stop;
as each student enters or exits the bus:
 receiving an electronic signal identifying the student entering or exiting the bus;
 updating the second list of students by adding or removing the student entering or exiting the bus to or from the second list of students; and
 in response to updating the second list of students by adding or removing the student to or from the second list of students, automatically increasing or decreasing, on the display, a first count indicating a total number of the updated second list of students by one;
determining that the bus is leaving the designated stop;
automatically presenting, on the display, the first count indicating the total number of the updated second list of students on the bus while the bus is leaving the designated stop towards a subsequent stop of the list of respective stops, without presenting a list of students of the first list associated with the subsequent stop; and
automatically presenting, on the display, at least one of a second count indicating a total number of a list of students to enter at the subsequent stop or a third count indicating a total number of a list of students to exit at the subsequent stop.

2. The method of claim 1, further comprising:
receiving a first input from a driver selecting a student;
displaying a photo of the selected student and a user interface element for manually boarding or exiting the student; and
in response to a second input from the driver selecting the user interface element, adding or removing the student to or from the second list of students.

3. The method of claim 1, further comprising, in response to determining, as a student enters or exits the bus, that the student is not authorized to enter or exit the bus at the designated stop, performing at least one alert action.

4. The method of claim 3, wherein performing at least one alert action comprises at least one of:
presenting a visual indication on the display, or
playing an audible indication.

5. The method of claim 1, further comprising, in response to receiving, as a student exits the bus, an electronic signal identifying the student as a student subject to one or more individuals authorized to pick up the student, displaying an indication of the authorized individuals and a release input user interface element.

6. The method of claim 5, further comprising:
receiving, from a driver input, a selection of an authorized individual; and
recording an event of the selected authorized individual picking up the student.

7. The method of claim 5, further comprising:
receiving an electronic signal from an identifier of an individual; and
determining that the individual is authorized to pick up the student based on the received electronic signal of the identifier and stored information of the authorized individuals.

8. The method of claim 1, further comprising:
monitoring boardings of a particular list of students associated with a particular stop over a predetermined number of route completions;
automatically altering the particular list of students as a function of the monitored boardings following the predetermined number of route completions; and then
displaying on the screen the altered particular list of students while students board at the particular stop on a subsequent route.

9. The method of claim 1, further comprising:
maintaining a list of identified students on the onboard computing device on the bus arriving at a transfer location;
transferring the list of identified students to a mobile computing device at the transfer location;
presenting on a display of the mobile computing device the list of identified students; and
as each student is checking in:
 receiving, on the mobile computing device, an electronic signal identifying the student;
 determining that the identified student is in the list of identified students; and
 presenting a visual indication on the display of the mobile computing device to indicate that the identified student has checked in.

10. The method of claim 1, further comprising:
determining that the bus is at the designated stop;
determining that a first plurality of students are assigned to exit at the designated stop;
receiving a second plurality of student identifiers from students exiting the bus at the designated stop;
determining that the bus is pulling away from the designated stop;
determining that one or more students assigned to exit at the designated stop have not exited the bus based on the determined second plurality of students that have exited the bus at the designated stop and the determined first plurality of students that are assigned to exit at the designated stop; and
in response to determining that the bus is pulling away from the designated stop and determining that the one or more students assigned to exit at the designated stop have not exited the bus, performing, by the onboard computing device, an alert action to alert the driver that the one or more students assigned to exit at the designated stop have not exited the bus.

11. The method of claim 10, wherein determining that the bus is pulling away from the designated stop comprises one of:
using a locating system to monitor a current location of the bus, and
using an accelerometer or a door sensor to determine a door open or close event.

12. The method of claim 1, further comprising:
determining that the bus has reached the subsequent stop;
presenting on the display the list of students of the first list associated with the subsequent stop; and
in response to updating the second list of students when receiving electronic signals identifying students entering or exiting the bus at the subsequent stop, automatically updating, on the display, the first count indicating the total number of the second list of students on the bus.

13. The method of claim 1, further comprising:
determining that the bus has reached the subsequent stop;
presenting on the display the list of students of the first list associated with the subsequent stop; and presenting on the display the at least one of the second count indicating the total number of the list of students to enter at the subsequent stop or the third count indicating the total number of the list of students to exit at the subsequent stop.

14. The method of claim 1, further comprising:
in response to receiving an electronic signal identifying the student entering or exiting the bus, logging a boarding or disembarking event by recording at least one of timestamp or location.

15. The method of claim 1, further comprising:
in response to receiving an electronic signal identifying the student entering or exiting the bus, transmitting a notification notifying that the student has entered or exited the bus at the designated stop to a remote communication device of an authorized person associated with the student.

16. The method of claim 1, further comprising:
in response to determining, as a student enters or exits the bus, that the student is not authorized to enter or exit the bus at the designated stop, presenting at least one of a manual cancellation user interface element or a manual override user interface element on the display.

* * * * *